United States Patent
Amini et al.

(10) Patent No.: US 9,131,395 B2
(45) Date of Patent: Sep. 8, 2015

(54) ACKNOWLEDGMENT AND/OR RECEIVER RECOVERY MECHANISMS FOR SCHEDULED RESPONSES WITHIN MULTIPLE USER, MULTIPLE ACCESS, AND/OR MIMO WIRELESS COMMUNICATIONS

(75) Inventors: Peiman Amini, Mountain View, CA (US); Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 410 days.

(21) Appl. No.: 13/218,537

(22) Filed: Aug. 26, 2011

(65) Prior Publication Data

US 2012/0057471 A1 Mar. 8, 2012

Related U.S. Application Data

(60) Provisional application No. 61/381,048, filed on Sep. 8, 2010.

(51) Int. Cl.
  *H04J 3/14* (2006.01)
  *H04W 24/04* (2009.01)
  *H04W 72/04* (2009.01)

(52) U.S. Cl.
  CPC .......... *H04W 24/04* (2013.01); *H04W 72/0413* (2013.01)

(58) Field of Classification Search
  None
  See application file for complete search history.

(56) References Cited

U.S. PATENT DOCUMENTS

| | | | | |
|---|---|---|---|---|
| 2006/0045048 | A1* | 3/2006 | Kwon et al. | 370/329 |
| 2006/0221879 | A1* | 10/2006 | Nakajima et al. | 370/310 |
| 2007/0149249 | A1* | 6/2007 | Chen et al. | 455/561 |
| 2008/0056298 | A1* | 3/2008 | Nakayama | 370/448 |
| 2008/0112351 | A1* | 5/2008 | Surineni et al. | 370/312 |
| 2009/0046613 | A1* | 2/2009 | Gaur | 370/312 |
| 2009/0046618 | A1* | 2/2009 | Shiba et al. | 370/312 |
| 2009/0059834 | A1* | 3/2009 | Qian | 370/312 |
| 2009/0086706 | A1* | 4/2009 | Huang et al. | 370/349 |
| 2009/0201890 | A1* | 8/2009 | Lee et al. | 370/336 |
| 2009/0279470 | A1* | 11/2009 | Seok | 370/312 |
| 2009/0323608 | A1* | 12/2009 | Adachi et al. | 370/329 |
| 2010/0165907 | A1* | 7/2010 | Chu et al. | 370/312 |
| 2010/0208579 | A1* | 8/2010 | Stephens | 370/216 |

(Continued)

*Primary Examiner* — Anez Ebrahim
*Assistant Examiner* — Gautam Sharma
(74) *Attorney, Agent, or Firm* — Garlick & Markison; Shayne X. Short

(57) ABSTRACT

Acknowledgment and/or receiver recovery mechanisms for scheduled responses within multiple user, multiple access, and/or MIMO wireless communications. Explicit scheduling information is provided from a first wireless communication device (e.g., an access point (AP), a transmitting wireless communication device) to a number of other wireless communication devices (e.g., wireless stations (STAs), receiving wireless communication devices) directing those other wireless communication devices a manner by which responses (e.g., acknowledgments (ACKs), block acknowledgments (BACKs), training feedback frames, etc.) are to be provided to the first wireless communication device there from. Such direction may include the order, timing, cluster assignment, etc. by which each respective wireless communication device is to provide its respective response to the first wireless communication device. In the event of the first wireless communication device failing to receive at least one response from at least one of the other wireless communication devices, various communication medium recovery mechanisms may be performed.

20 Claims, 27 Drawing Sheets

(56) References Cited

U.S. PATENT DOCUMENTS

| | | | |
|---|---|---|---|
| 2011/0039593 A1* | 2/2011 | Lee et al. | 455/515 |
| 2011/0176627 A1* | 7/2011 | Wu et al. | 375/260 |
| 2011/0194644 A1* | 8/2011 | Liu et al. | 375/295 |
| 2011/0317609 A1* | 12/2011 | Sammour et al. | 370/312 |
| 2011/0317630 A1* | 12/2011 | Zhu et al. | 370/329 |
| 2012/0082200 A1* | 4/2012 | Verikoukis et al. | 375/227 |

* cited by examiner

FIG. 16A

| FC | DUR | RA | TA | SCHED | FCS | always present (FC through TA)

new control type:
FC contains TYPE=Control,
Subtype=SCH (e.g., currently reserved value for management type)

FIG. 16B

| FC | DUR | RA | TA | BSSID | SEQ | HT Control | SCHED | FCS | always present (FC through BSSID)

HT Control: optional new management frame:
FC contains TYPE=Management,
Subtype=SCH (e.g., currently reserved value for management type)

FIG. 16C

| FC | DUR | RA | TA | BSSID | SEQ | HT Control | Category | Action | SCHED | FCS | always present (FC through BSSID)

HT Control: optional existing management frame:
FC contains TYPE=Management,
Subtype=Action,
Action=SCHED (e.g., new value for action of any category)

SCH frame after CTS

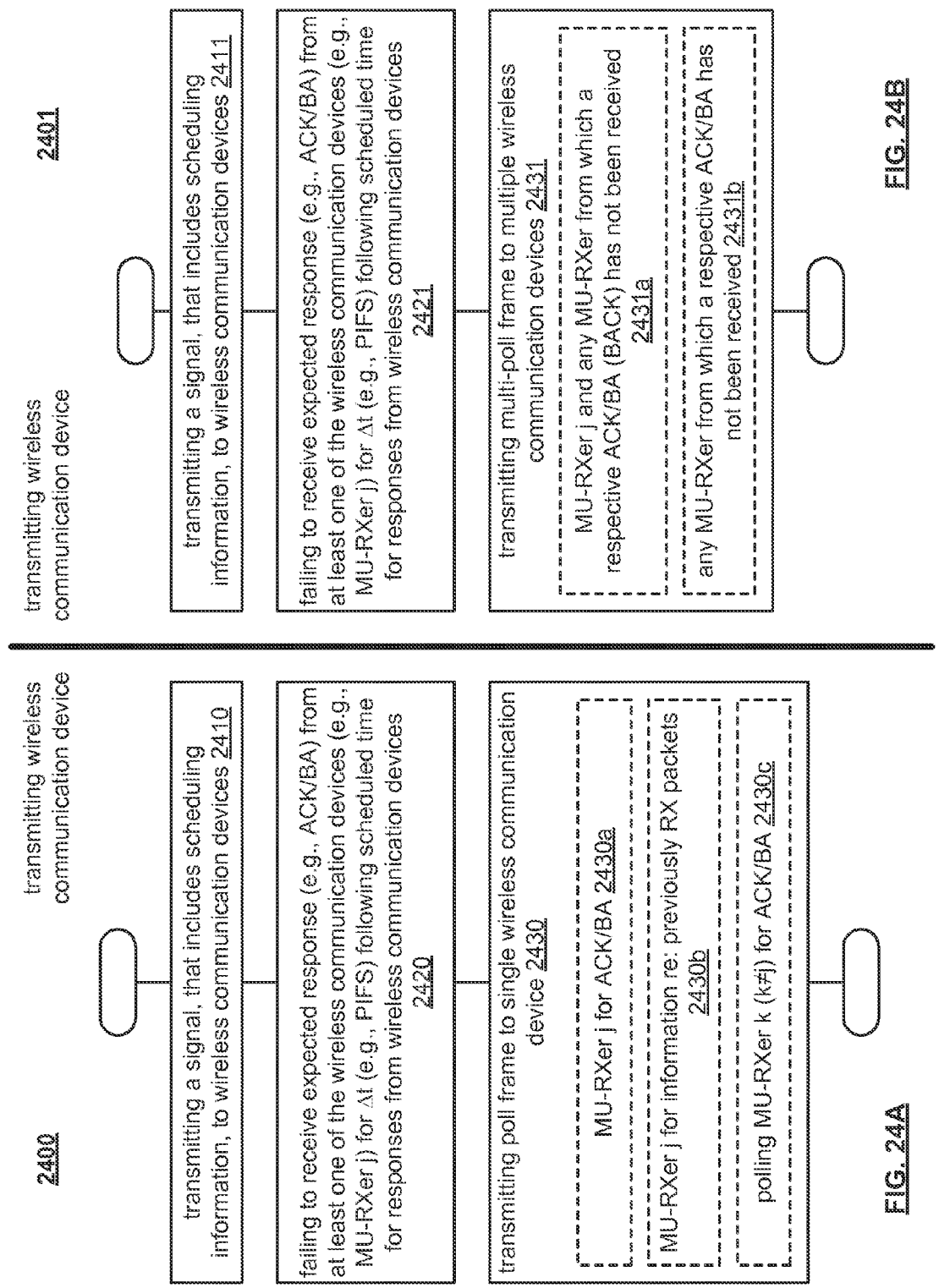

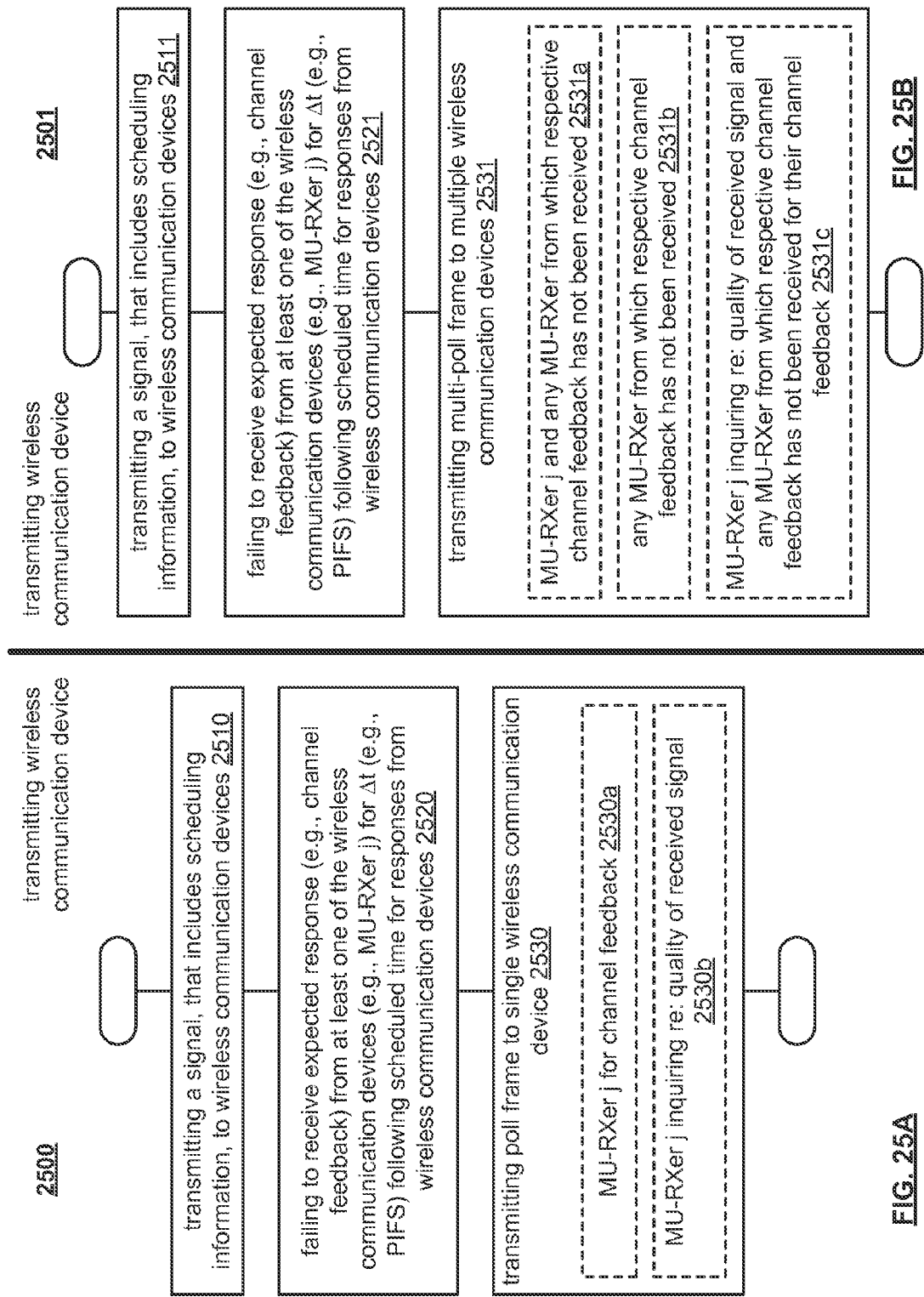

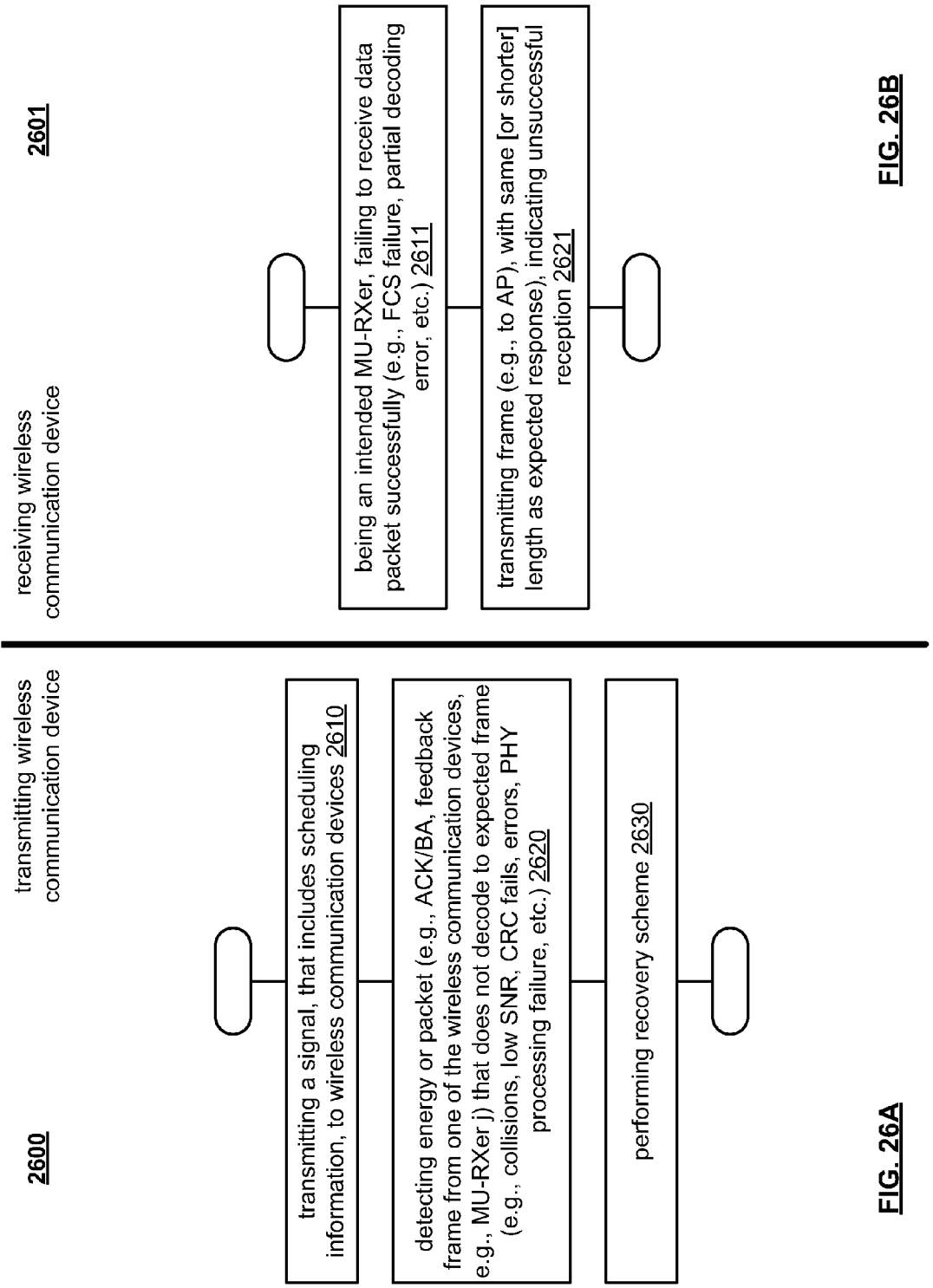

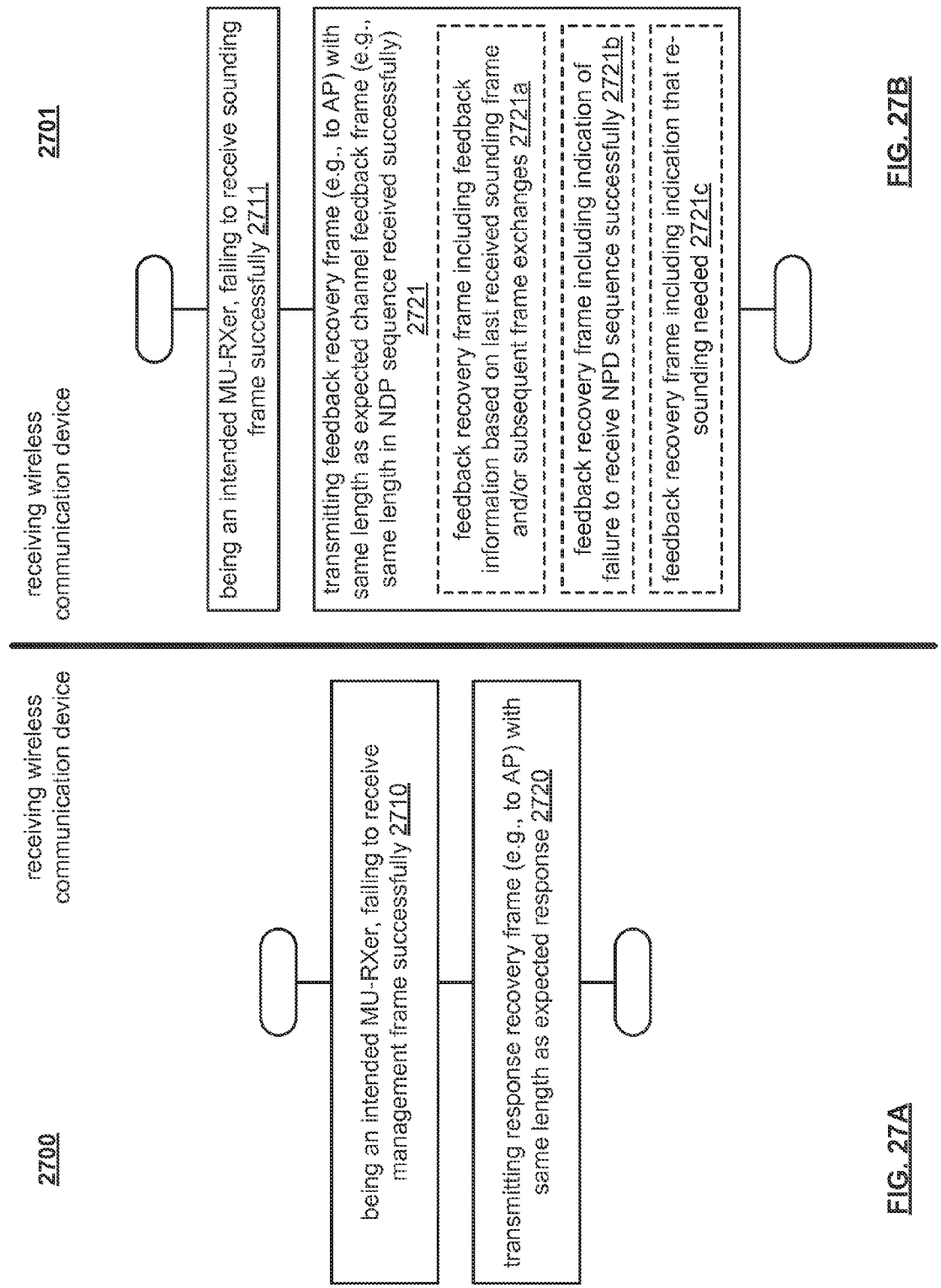

ACKNOWLEDGMENT AND/OR RECEIVER RECOVERY MECHANISMS FOR SCHEDULED RESPONSES WITHIN MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/381,048, entitled "Acknowledgment and/or receiver recovery mechanisms for scheduled responses within multiple user, multiple access, and/or MIMO wireless communications," filed Sep. 8, 2010, pending.

Incorporation by Reference

The following IEEE standards are hereby incorporated herein by reference in their entirety and are made part of the present U.S. Utility Patent Application for all purposes:

1. IEEE Std 802.11™—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™—2007, (Revision of IEEE Std 802.11-1999), 1233 pages.

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 pages.

3. IEEE P802.11ac™/D1.1, August 2011, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz," Prepared by the 802.11 Working Group of the 802 Committee, 297 total pages (pp. i-xxiii, 1-274).

BACKGROUND OF THE INVENTION

1. Technical Field of the Invention

The invention relates generally to communication systems; and, more particularly, it relates to acknowledgment and/or receiver recovery mechanisms for scheduled responses within multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIG. 16A, FIG. 16B, and FIG. 16C are diagrams illustrating various embodiments of frames including a respective schedule field therein.

FIG. 24A, FIG. 24B, FIG. 25A, FIG. 25B, FIG. 26A, FIG. 26B, FIG. 27A, and FIG. 27B are diagrams illustrating embodiments of methods for operating one or more wireless communication devices.

DETAILED DESCRIPTION OF THE INVENTION

Figure 1:
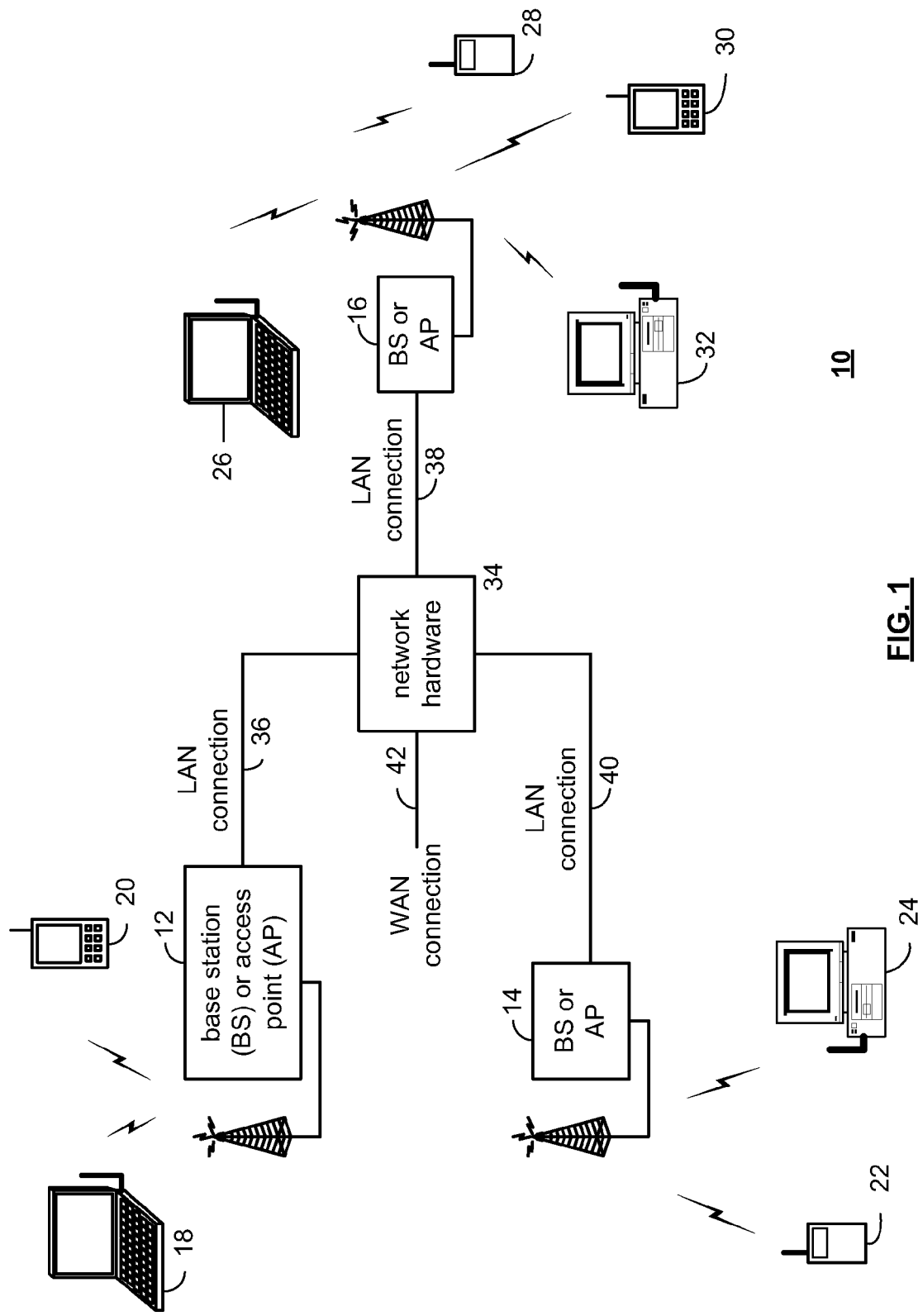
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
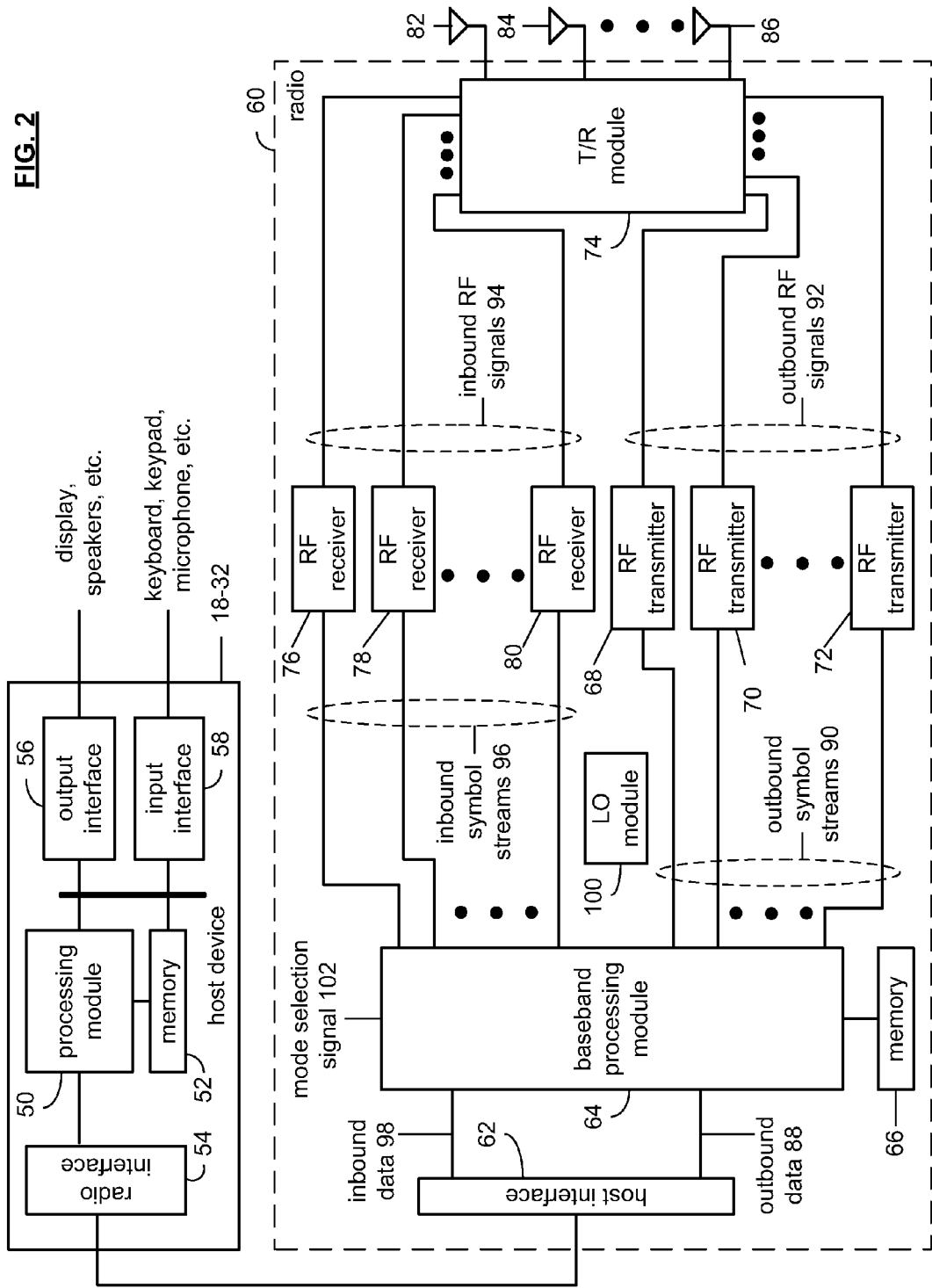
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
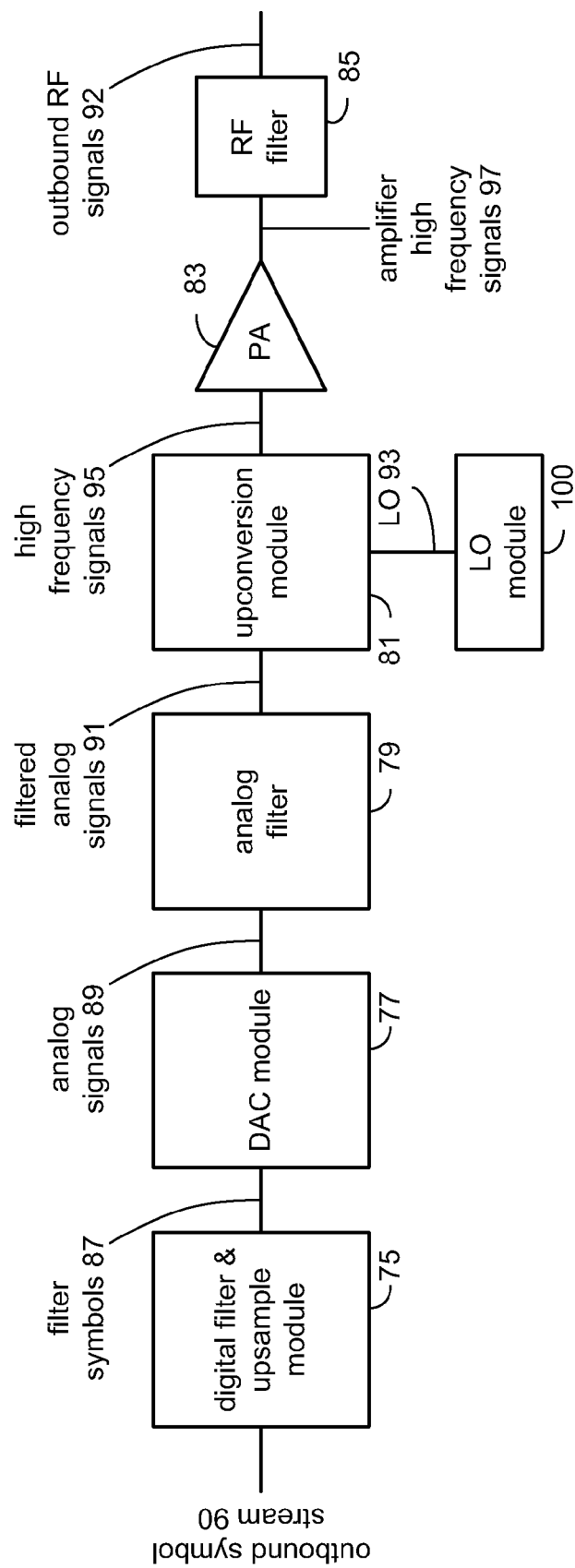
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an inphase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
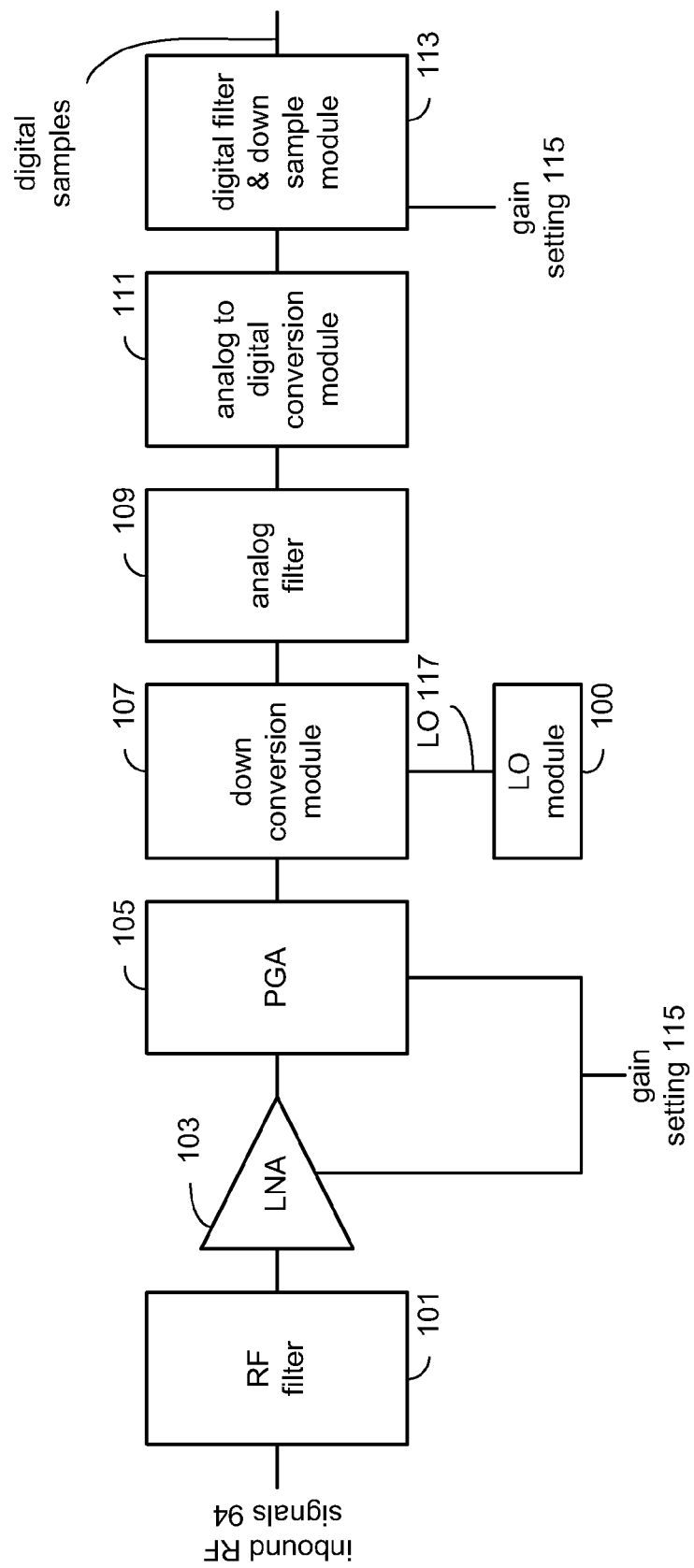
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency bandpass filter, receives the inbound RF signals 94 and filters them to produce filtered inbound RF signals. The low noise amplifier 103 amplifies the filtered inbound RF signals 94 based on a gain setting 115 and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) signal 117 that is provided by the local oscillation module 100 to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
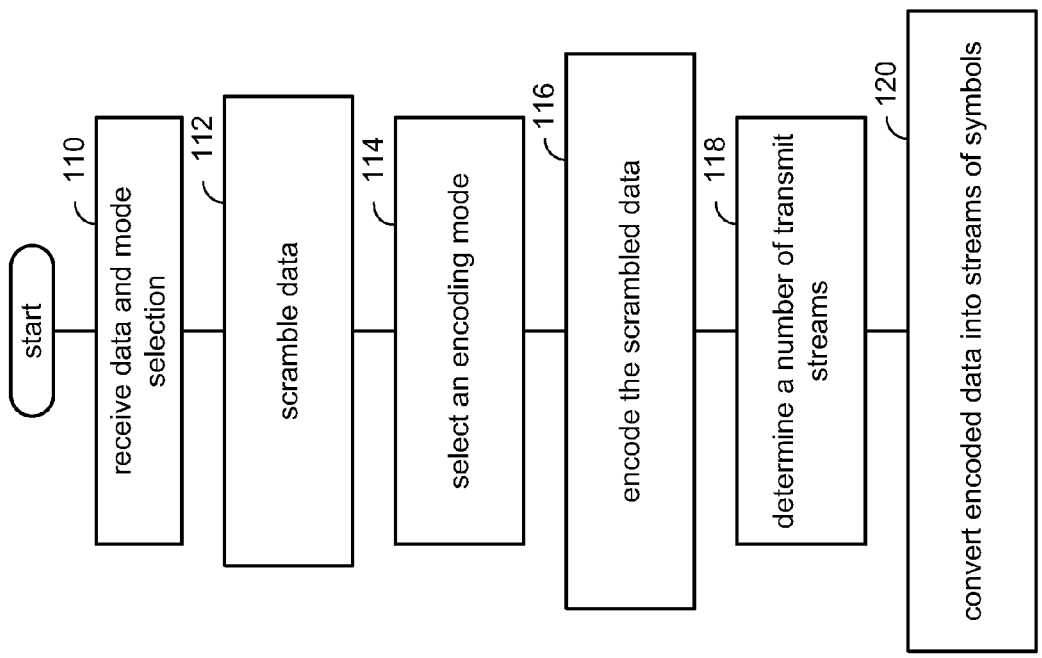
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
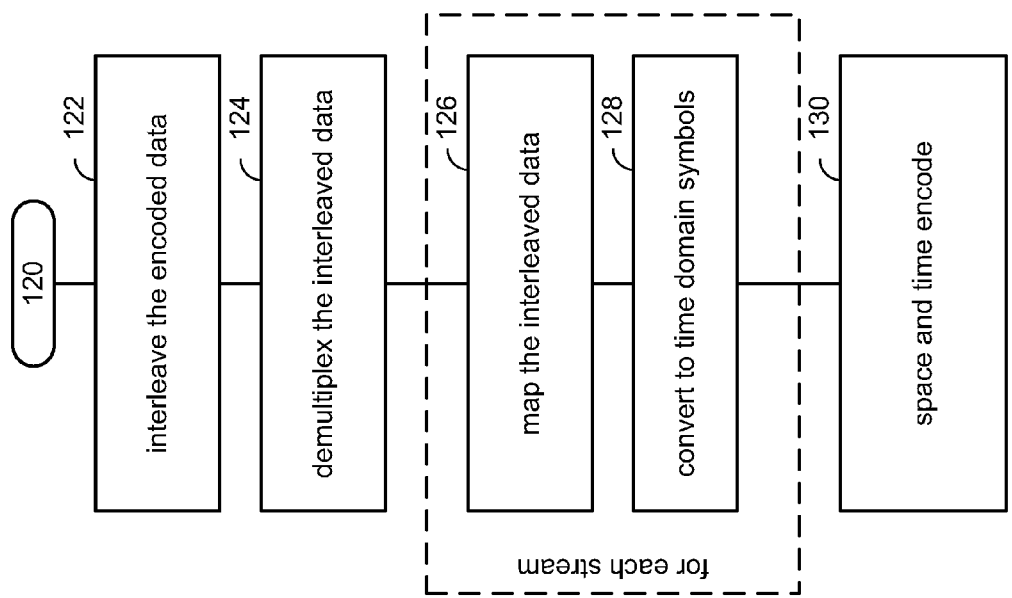
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
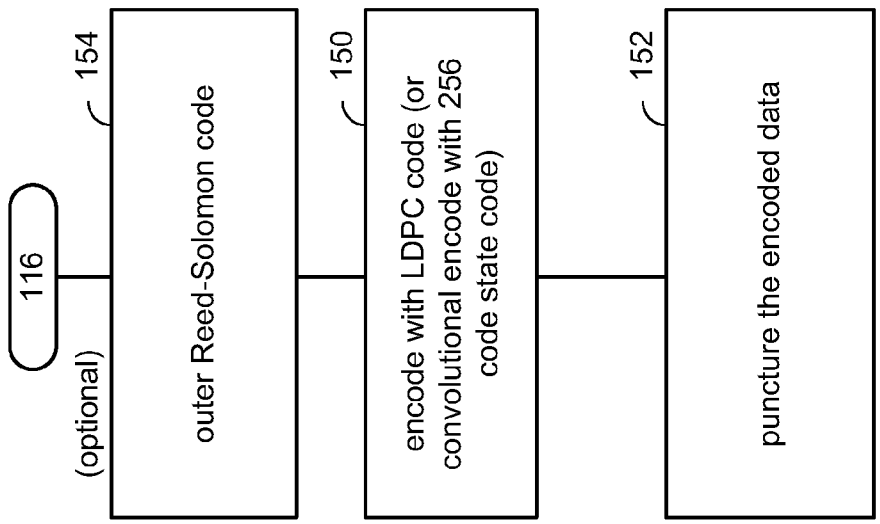
FIGS. 7-9 are diagrams illustrating various embodiments for encoding the scrambled data.
Figure 8:
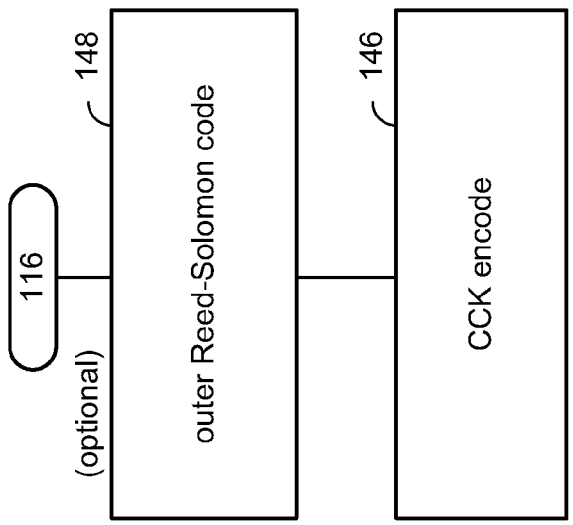
Figure 7:
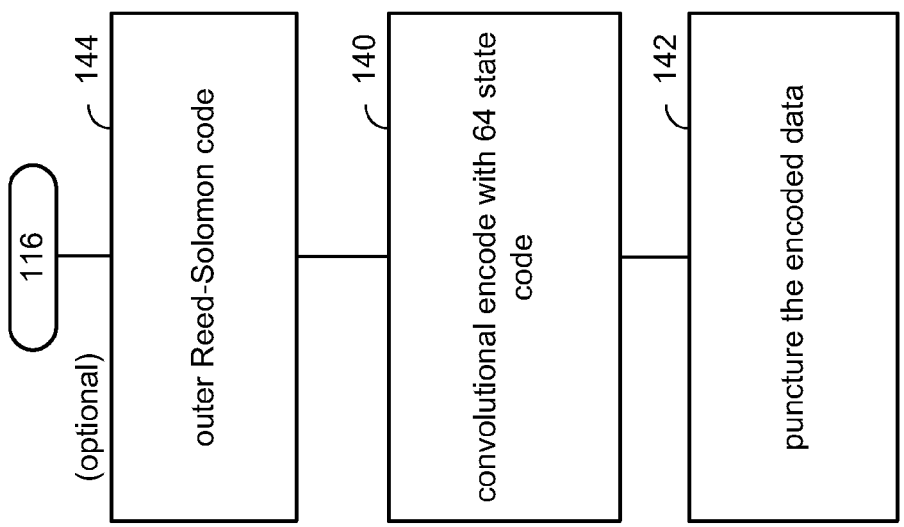

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include 1/2, 2/3 and/or 3/4, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
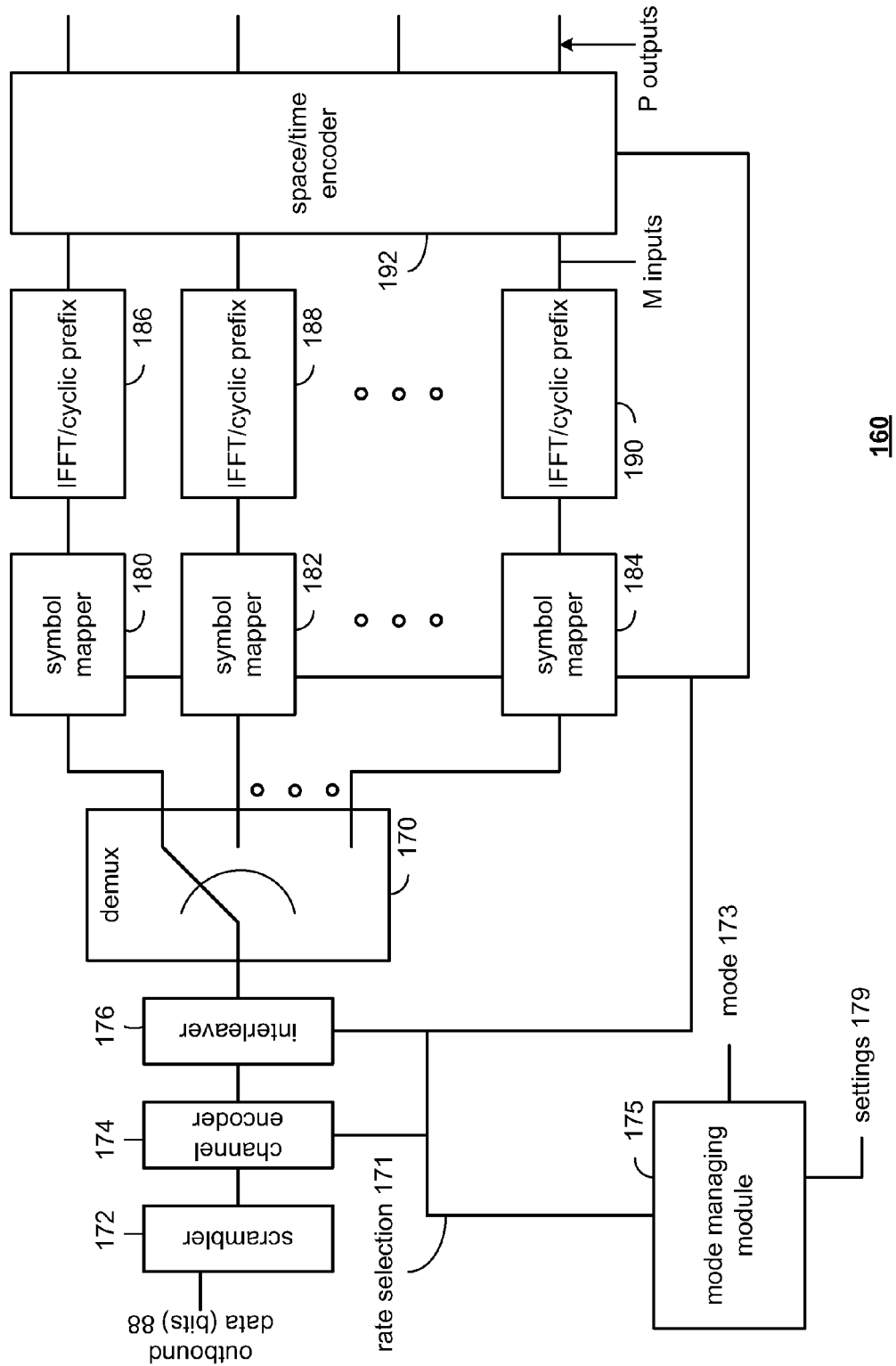
FIGS. 10A and 10B are diagrams illustrating embodiments of a radio transmitter.
Figure 10B:
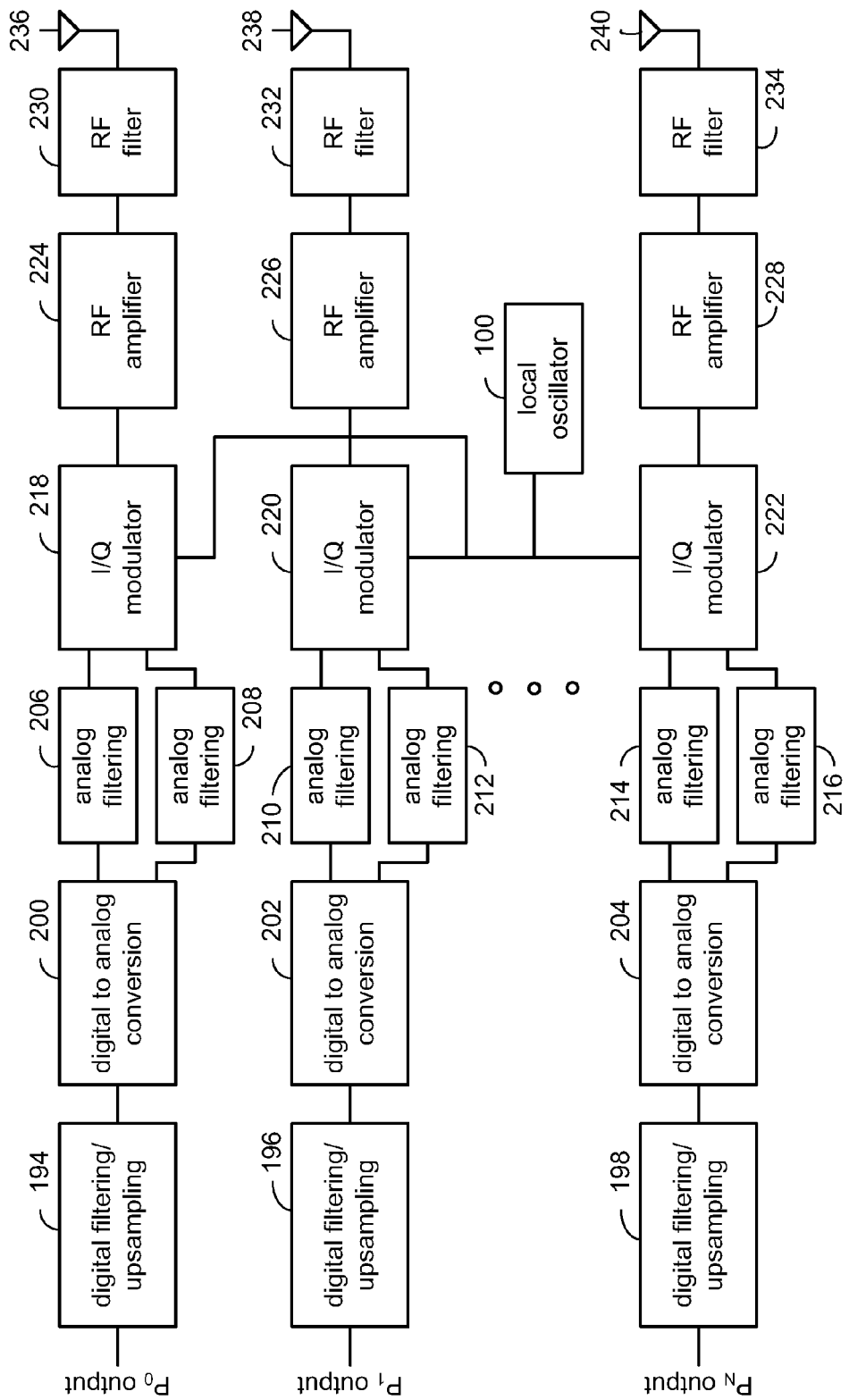

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate 1/2 convolutional encoder with 64 states and a generator polynomials of $G_0=133_8$ and $G_1=171_8$. The output of the convolutional encoder may be punctured to rates of 1/2, 2/3, and 3/4 according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, etc.) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
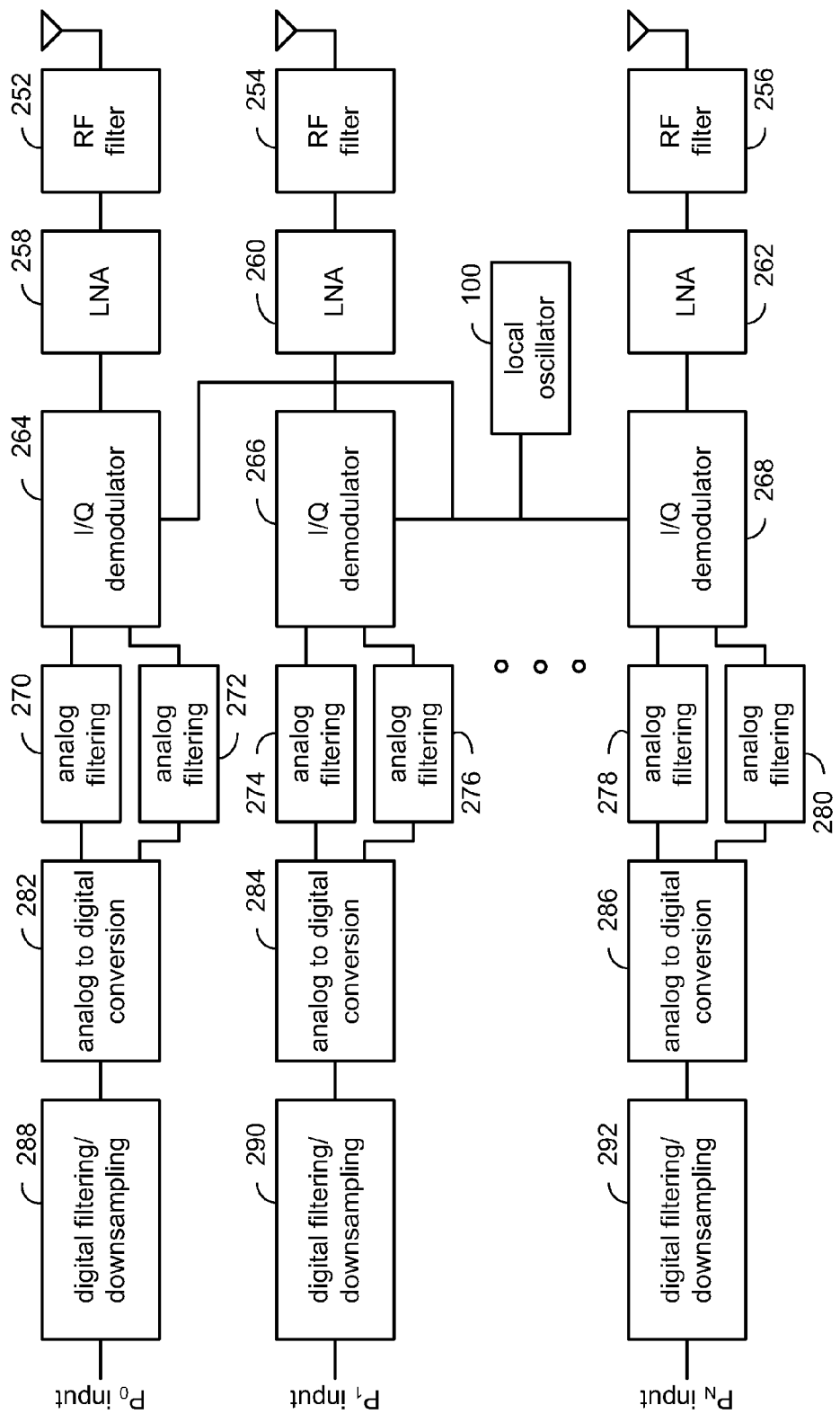
FIGS. 11A and 11B are diagrams illustrating embodiments of a radio receiver.
Figure 11B:
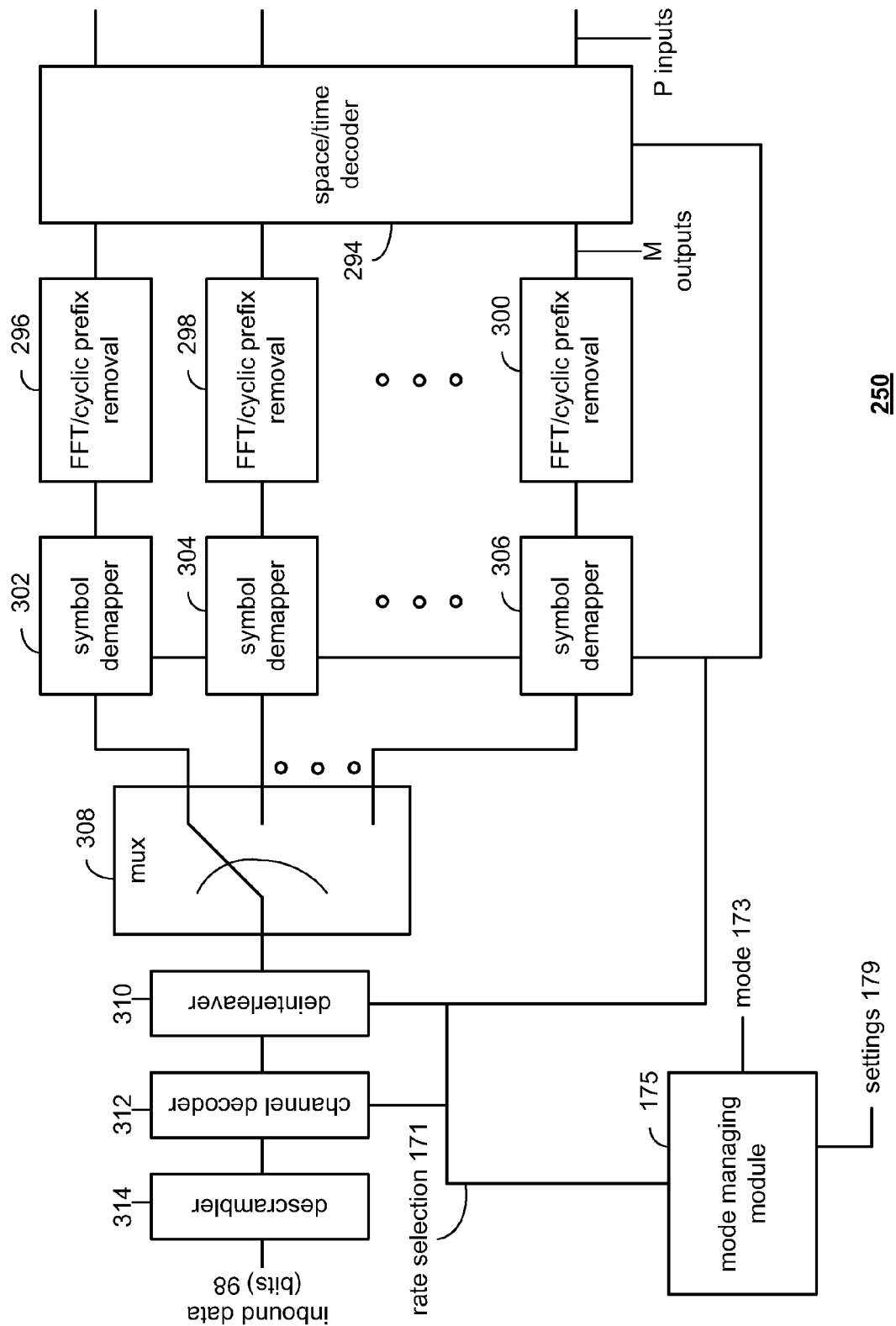

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
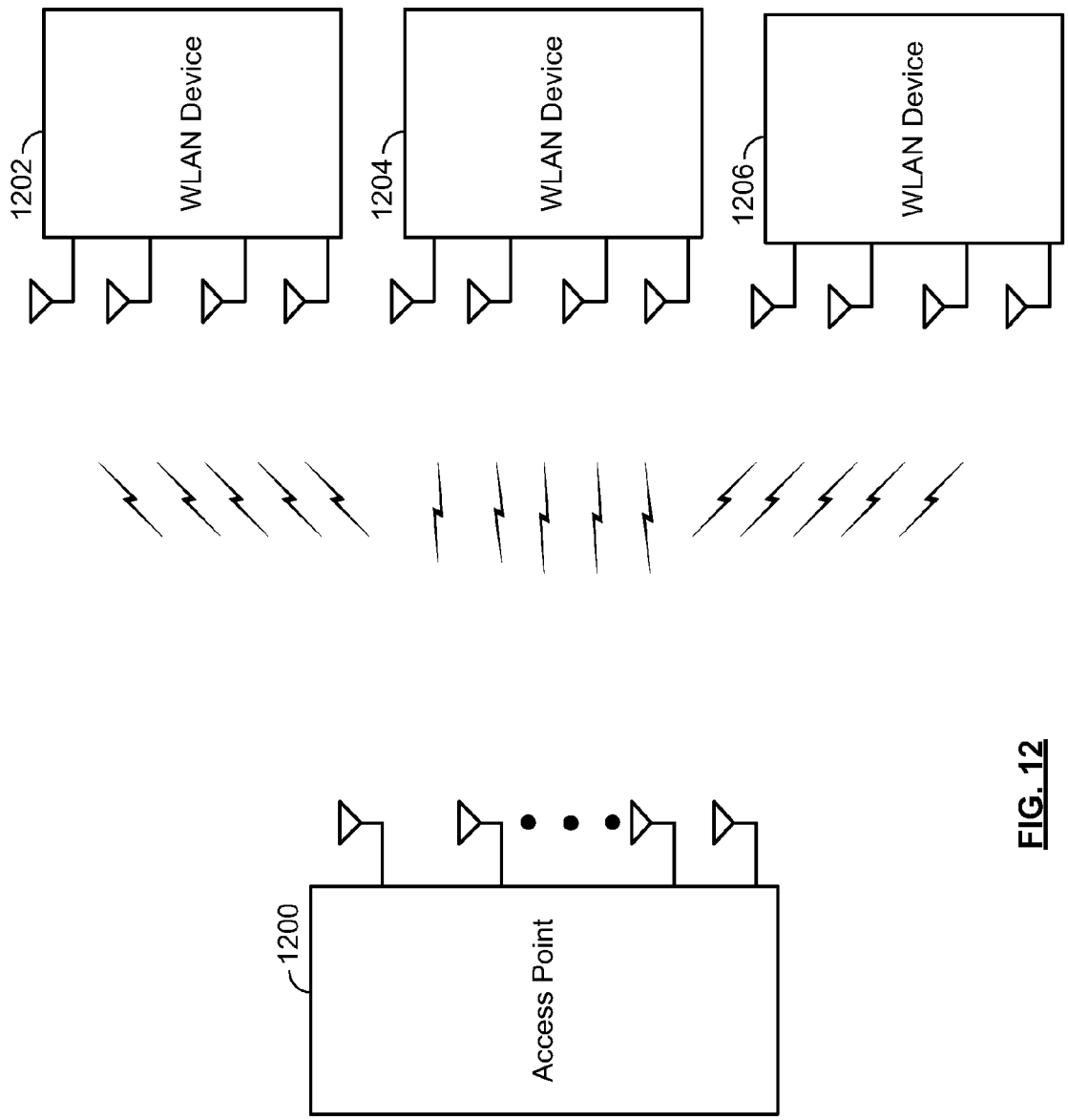
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 13:
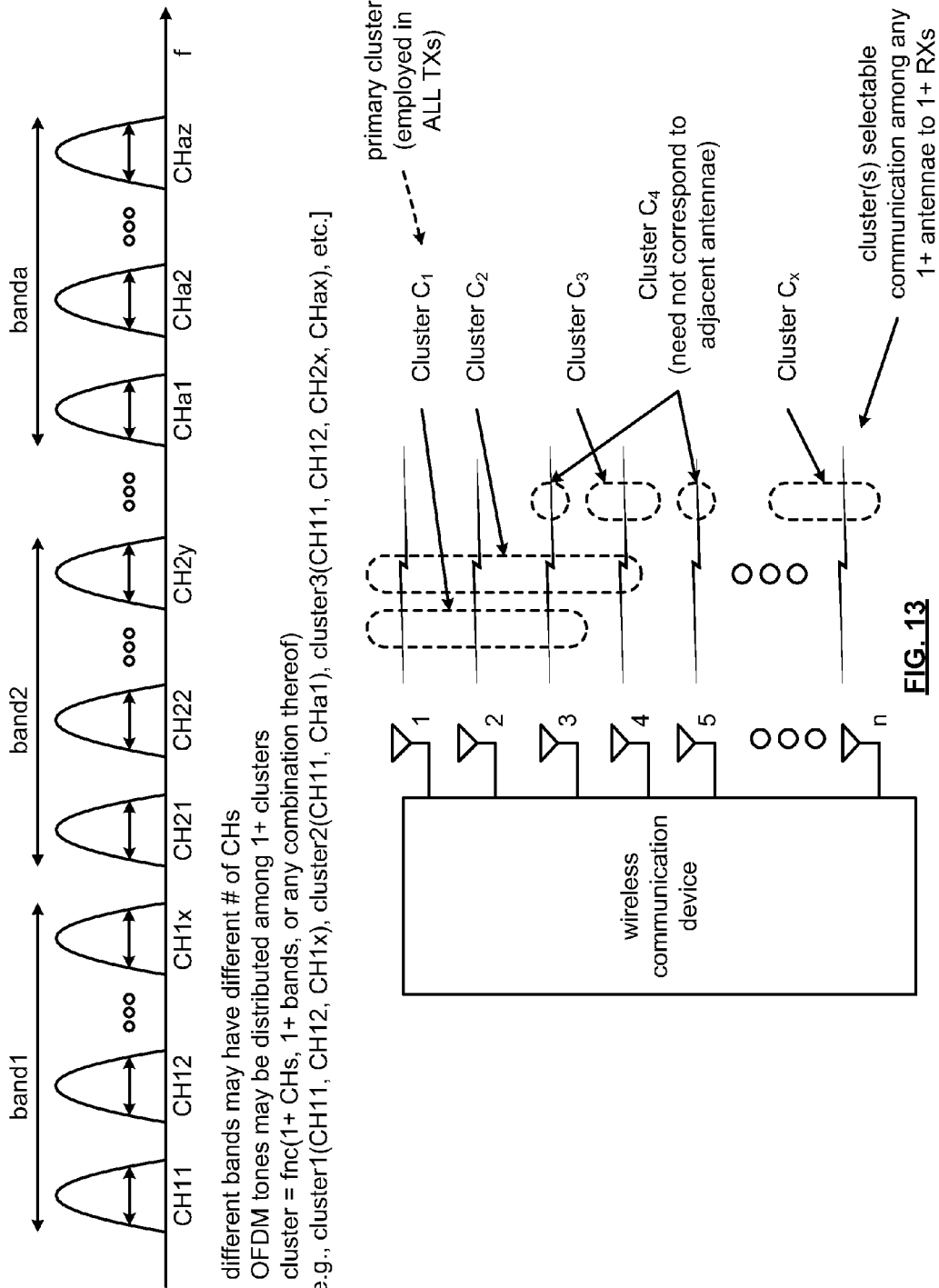
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Figure 14:
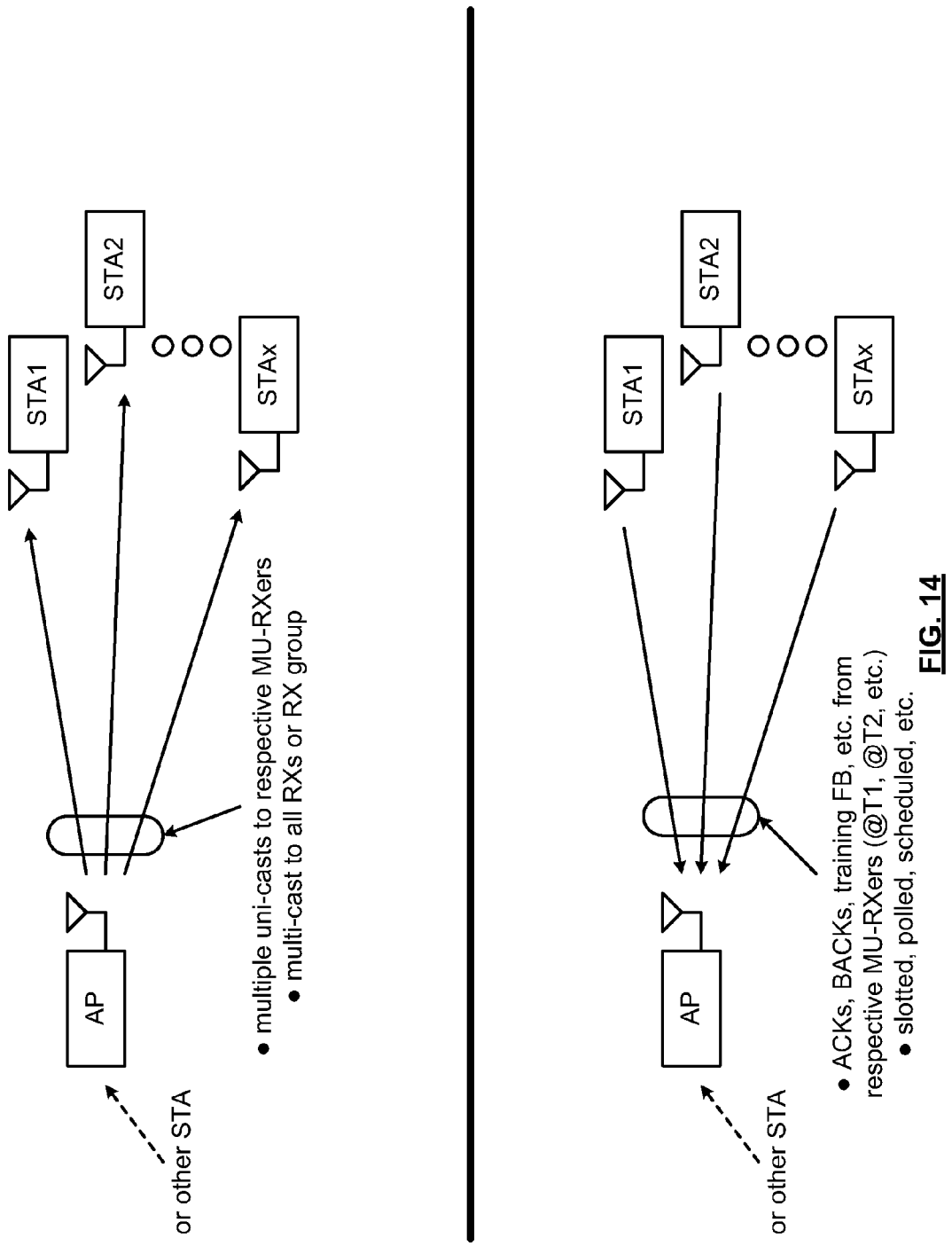
FIG. 14 is a diagram illustrating an embodiment of a wireless communication system in which communications are made between various wireless communication devices therein.

FIG. 14 is a diagram illustrating an embodiment of a wireless communication system in which communications are made between various wireless communication devices therein. Various mechanisms are described herein may be employed for scheduling communications between various wireless communication devices within a multi-user (MU) environment.

In some instance, data transmissions may be targeted for reception by multiple individual receiving wireless communication devices (e.g., STAs). Such communications may be MU-MIMO and/or OFDMA transmissions. The transmitter of such a frame may generally be referred to a multi-user transmitter (MU-TXer) such as a transmitting wireless communication device (e.g., AP or a STA). Each intended recipient of at least a portion of such a frame may generally be referred to a multi-user receiver (MU-RXer) such as a receiving wireless communication device (e.g., STA).

The multi-user packet may be any one or combination of data, channel sounding, control or management frames, etc. The intended MU-RXers of the MU-MIMO or OFDMA (or combination thereof) transmission need to respond to the reception of information with some form of response (often such as requested by the transmitting wireless communication device). Some examples of responses may include acknowledgements (ACK) or block acknowledgements (BAs), feedback, and/or any other types of responses. In any of various diagrams and/or embodiments herein, when any one such type of response is employed therein, an alternative embodiment or variant may be implemented using another type of response without departing from the scope and spirit of the invention. For example, with respect to different acknowledgement types, some examples of acknowledgments (ACKs) may be either a single acknowledgement or a block acknowledgement. Various response schemes may be operated in accordance with various principles presented herein including slotted, polled, and scheduled response schemes.

A MU-TXer may employ MU-MIMO and/or OFDMA training exchanges to establish data transmission operational parameters. These training exchanges require the transmission of feedback from the MU-RXer. The feedback is sent as a response to MU-MIMO/OFDMA training. The feedback can be sent using any of various response schemes including slotted, polled, and scheduled feedback.

Mechanisms by which scheduling information may be conveyed from a transmitting wireless communication device (e.g., AP) to a number of receiving wireless communication devices (e.g., STAs) are presented herein.

For the scheduled response scheme, the MU-RXer response transmission is sent according to a schedule. For example, following a downlink (DL) MU-MIMO transmission, the MU-RXer STAs each respond in turn. That is to say, each receiving wireless communication device (e.g., STA) responds according to a particular schedule. For example, such as schedule may indicate the respective order by which the respective receiving wireless communication devices (e.g., STAs) are to provide their respective responses to a transmitting wireless communication device (e.g., AP). The time duration allocated to each of the respective receiving wireless communication devices (e.g., STAs) need not necessarily be the same. For example, a first time duration may be allocated for a first of the receiving wireless communication devices (e.g., STAs) to provide its respective response, while a second time duration may be allocated for a second of the receiving wireless communication devices (e.g., STAs) to provide its respective response, and so on. Also, the respective cluster assignment for each respective one of the receiving wireless communication devices (e.g., STAs) may be provided within such scheduling information that is included within a signal (e.g., a multi-user packet, a downlink communication, etc.) provided from a transmitting wireless communication device to the respective receiving wireless communication devices. If desired, the different respective responses may be directed to be provided via different respective clusters. For example, a first cluster may be allocated for a first of the receiving wireless communication devices (e.g., STAs) to provide its respective response, while a second cluster may be allocated for a second of the receiving wireless communication devices (e.g., STAs) to provide its respective response, and so on.

The following methodologies may be used to carry scheduled information to the receiving stations. A frame may be included with response schedule information in the DL MU-MIMO packet (schedule (SCH) frame). A multi-cast may be transmitted such that is that carries the response schedule information to the participating MU-RXer stations.

Response schedule information may be including within a modified format of the request to send (RTS) frame that precedes the DL MU-MIMO transmission and which becomes part of the complete sequence of frames in the exchange.

A schedule (SCH) frame may be used to carry the scheduled timing information. An individual SCH frame may be used for each MU MU-RXer, containing scheduling information specific for that MU-RXer. The SCH frame can be aggregated in an aggregated MAC data protocol unit (A-MPDU) for each MU-RXer.

There may be a distinct SCH frame per MU-RXer. The SCH frame may be a new Control Type and Subtype frame containing the following fields: FC, DUR, RA, TA, 2-octet schedule information for this RA (so as to include a relative timing point from end of MU-DL PPDU).

Figure 15:
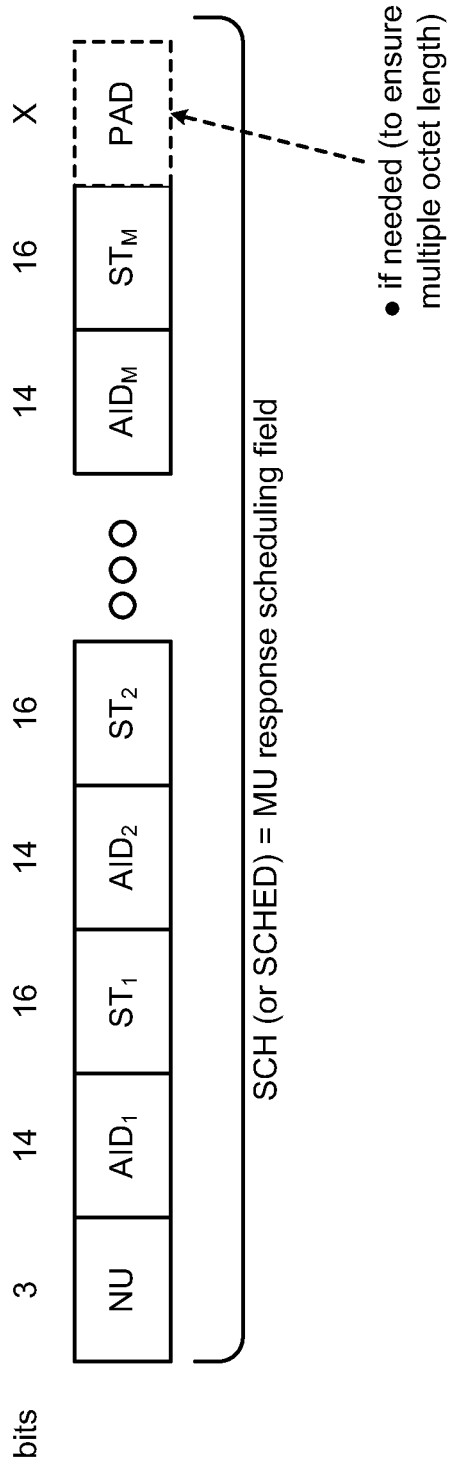
FIG. 15 is a diagram illustrating an embodiment of schedule field.

FIG. 15 is a diagram illustrating an embodiment of schedule field. A multicast frame may be used to carry scheduling information in DL MU-MIMO. A multi-cast recipient address (RA) may be used for this frame.

A MU scheduling field (e.g., shown as SCH or SCHED) is included in the multicast frame's body to carry schedule time for each MU-RXer. Such a MU scheduling field is has the number of stations plus AID or MAC address of each MU-RXer followed by two octets of timing information for each MU-RXer ($ST_N$ field). One or more pad bits may filled is added at the end of MU scheduling field to make the total size an integer multiple of octets. This PAD field contains a variable number of bits, and may include as few as 0 bits.

The multicast frame may be transmitted after the DL MU-MIMO frame; alternatively, the multicast frame may be transmitted before the DL MU-MIMO frame (e.g., between a clear to send (CTS) and the DL-MU-MIMO frame).

The multicast frame may be a new control subtype, or a new management frame. Alternatively, the field may be included in the body of an existing frame (e.g., an Action frame).

A request to send (RTS) frame may be modified to carry the MU scheduling information. For example, MU scheduling information may be aggregated within RTS.

A MU-RXer may use the scheduled information in RTS. For example, this may be performed if the CTS and DL MU-MIMO packet is received successfully. Alternatively, this may be performed if CTS is not received and/or DL MU-MIMO packet is not received successfully (e.g., frame check sequence (FCS) failure) but the MU-RXer detects the DL MU-MIMO packet as having been transmitted from same MU TXer that sent the RTS. The MAC address in DL MU-MIMO packet may be used the packet to realize this packet is addressed to the MU-RXer. The timing of the DL MU-MIMO packet may be used to verify the DL MU-MIMO packet is transmitted from same MU-TXer.

FIG. 16A, FIG. 16B, and FIG. 16C are diagrams illustrating various embodiments of frames including a respective schedule field therein. A schedule (e.g., shown as SCH or SCHED) frame is a frame that includes, in one manner or another, scheduling information for use in DL MU-MIMO. Such scheduling information may be a separate and independent frame or it may be included in some other type of frame.

For example, a multi-cast RA may be used for SCH frame.

An MU scheduling field (SCHED) (i.e., a field within a frame) is included in the SCH frame's body to carry schedule time for each MU-RXer. Such a MU scheduling field may be implemented in accordance with the aspects presented herein.

In some embodiments, such as with respect to FIG. 16A, a SCH frame may be a new control subtype: FC contains TYPE=Control, Subtype=SCH (e.g. subtype uses any currently reserved subtype value for Control Type).

In even other embodiments, such as with respect to FIG. 16B, a SCH frame may be a new type of management frame: FC contains TYPE=Management, Subtype=SCH (e.g. subtype uses any currently reserved subtype value for Management Type).

In yet other embodiments, such as with respect to FIG. 16C, a SCH frame may be an existing management frame. As one example, the SCHED field may be included in the body of an Action frame. Alternatively, the FC may be implemented to contain Type=Management, Subtype=Action. The frame body may be implemented to contain Category=HT or other existing category, or a new category, e.g. VHT. The frame body may be implemented to contain Action=SCHEDULE (new value for action for any category).

Any of these various types of frames may also be sent as uni-cast without departing from the scope and spirit of the invention.

Figure 17:
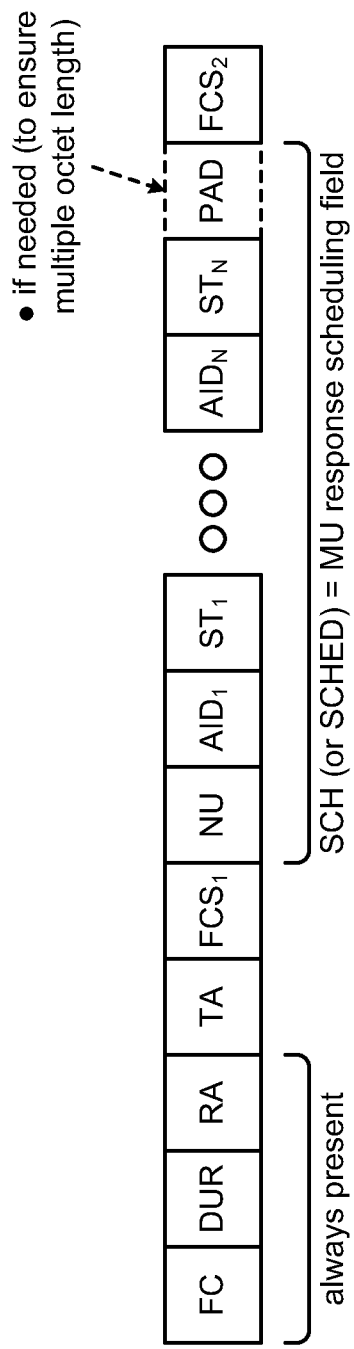
FIG. 17 is a diagram illustrating an embodiment of a modified request to send (RTS) format including a schedule field therein.

FIG. 17 is a diagram illustrating an embodiment of a modified request to send (RTS) format including a schedule field therein. The fields include are as described below:

FC, DUR, RA, TA (these are the same as fields in the IEEE 802.11 RTS frame with the same name)

$FCS_1$—this being the same as FCS field in the IEEE 802.11 RTS frame

NU=Number of Users (e.g., using 3 bits as in a previous embodiment)

$AID_N$=AID of Nth MU-RXer (e.g., using 14 bits as in a previous embodiment)

$ST_N$=Schedule Time information (e.g., using 16 bits as in a previous embodiment)

PAD (e.g., using as many bits as are needed in order to make total count of bits in the frame equal an integer multiple of eight, may be as small as ZERO bits)

It is noted that while certain embodiments herein are described using specific numbers of bits for certain respective fields within a given frame, it is generally noted that any desired number of bits may alternatively be used for different respective fields. For example, when more than eight users are desired to be indicated, the number of bits for the field NU may be increased. Also, it is noted that the schedule time information fields need not necessarily be uniform. For example, different respective time durations may be specified within different respective schedule time information fields. The order in which the respective AID and $ST_x$ fields occur within frame will indicate the respective order by which the receiving wireless communication devices are to provide their respective responses.

Figure 18:
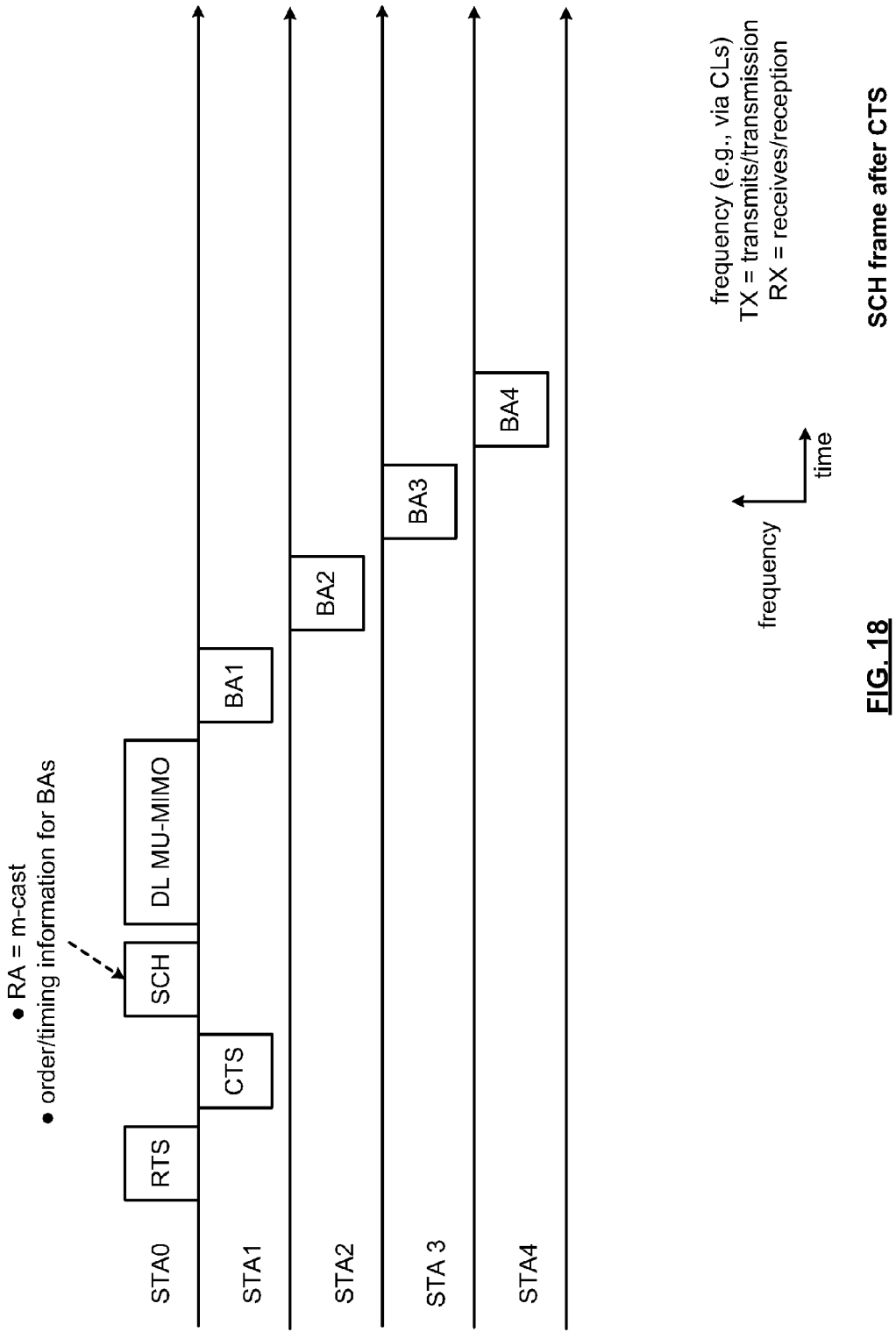
FIG. 18 is a diagram illustrating an embodiment of a timing diagram showing a schedule (SCH) frame being transmitted after a clear to send (CTS) frame.

FIG. 18 is a diagram illustrating an embodiment of a timing diagram showing a schedule (SCH) frame being transmitted after a clear to send (CTS) frame. A SCH frame is sent between a CTS frame and a DL MU-MIMO transmission. The SCH frame is sent with RA=multi-cast in this sequence (shown as being from STA0, which may be an AP).

Each STA receiving SCH frame examines the transmitter address (TA) field to see if it matches MAC address of the AP with which the STA is associated. If TA=AP address for this STA, then the STA examines the SCHED field in the frame to determine if it is an intended recipient of the expected subsequent DL MU-MIMO frame and if so, extracts the response scheduling information from the SCHED field and uses this information to schedule a subsequent response transmission. Order and/or timing of response BA transmissions is according to information that was delivered within the SCH frame. This embodiment shows STA1 providing its BA1, followed by STA2 providing its BA2, and so on. However, any alternative desired order may be employed by which the various STAs provide their BAs to the transmitting wireless communication device (e.g., STA0 or AP).

In addition, each of the respective STAs may provide its respective response using a particular cluster (e.g., one or more channels within one or more bands). For example, while the horizontal axis of this diagram properly understood to be that of time, the vertical axis of this diagram may be understood to be frequency. As such, each respective STA may provide its respective response using a different respective cluster. Again, it is noted that a cluster may be viewed as being any combination of one or more channels within one or more bands. In alternative embodiments, it is noted that the respective STAs may provide their respective responses using a common cluster. That is to say, each of the respective STAs may provide its respective response using the same cluster, yet at different times (e.g., STA1 providing its response using the common cluster during a time 1, the STA2 providing its response using the common cluster during a time 2, and so on).

Of course, it is also noted that various combinations of timing, order, and cluster assignment may also be employed. For example, different respective receiving wireless communication devices may provide their respective responses using a first cluster, while other respective wireless communication devices may provide their respective responses using a second cluster. That is to say, more than one of the respective receiving wireless communication devices may provide their respective responses using a cluster that is different than one or more clusters employed by other of the receiving wireless communication devices. Moreover, if the transmitting wireless communication device (e.g., STA0) has the capability, functionality, and/or circuitry, etc. to receive simultaneous communications from more than one receiving wireless communication device, scheduling information may be provided to the receiving wireless communication devices such that two or more of the receiving wireless communication devices that provide their respective responses simultaneously (e.g., at the same time/in parallel with one another using different respective clusters).

In some embodiments, each respective STA has a specified/predetermined cluster via which it should provide responses (e.g., such as by a default configuration, via some assignment provided from the STA0, etc.). In other embodiments, such a signal provided from the STA0 provides cluster assignments by which the respective wireless communication devices are to provide their respective responses to STA0. Such cluster assignment for responses need not be static, but may be adapted and dynamically changed over time. For example, each respective receiving wireless communication device may include a sequence of cluster assignments that there is a function of time, and depending upon the current time, a given receiving wireless communication device may operate in accordance with the current cluster assignment. Alternatively, a transmitting wireless communication device (e.g., STA0) may provide respective cluster assignments at different respective times to the various receiving wireless communication devices, including providing updated or modified cluster assignments at different times. Each respective receiving wireless communication device would then operate based upon the most recently received cluster assignment. As may be understood, a given receiving wireless communication device may provide its respective responses using different respective clusters at different respective times (e.g., such as in accordance with different respective cluster assignments).

Figure 19:
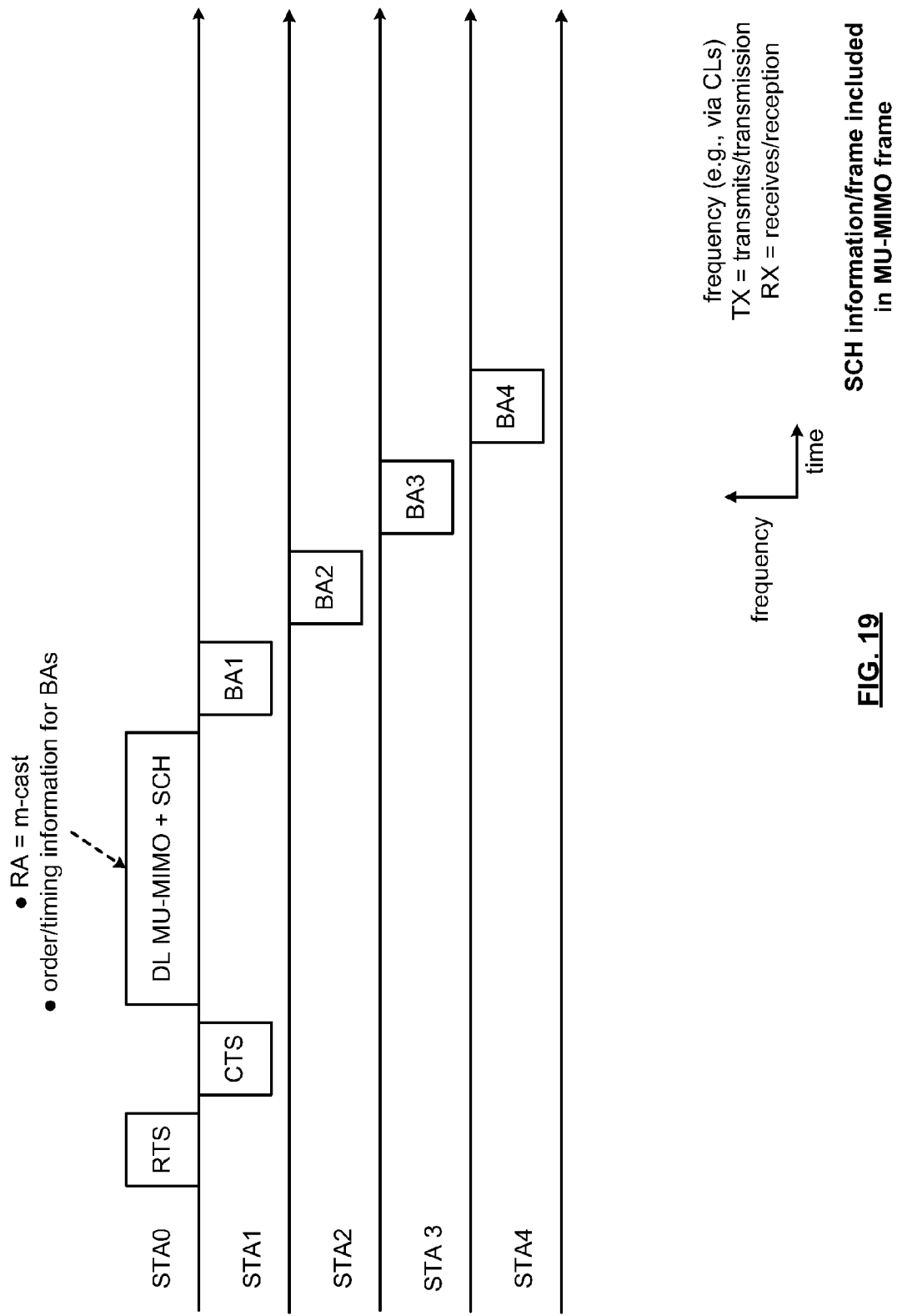
FIG. 19 is a diagram illustrating an embodiment of a timing diagram showing a schedule (SCH) frame being transmitted after a clear to send (CTS) frame such that the scheduling information is included in a multi-user multiple-input-multiple-output (MU-MIMO) frame (which may include data therein).

FIG. 19 is a diagram illustrating an embodiment of a timing diagram showing schedule (SCH) information/frame being transmitted after a clear to send (CTS) frame such that the scheduling information/frame is included in a multi-user multiple-input-multiple-output (MU-MIMO) frame (which may include data therein).

This embodiment differs from the previous embodiment at least, in that, scheduling information is actually included within a downlink MU-MIMO frame (e.g., which may include data therein). As may be understood, in various embodiments, such scheduling information may be provided in a separate signal than one including data, or within a frame that does include data.

Figure 20:
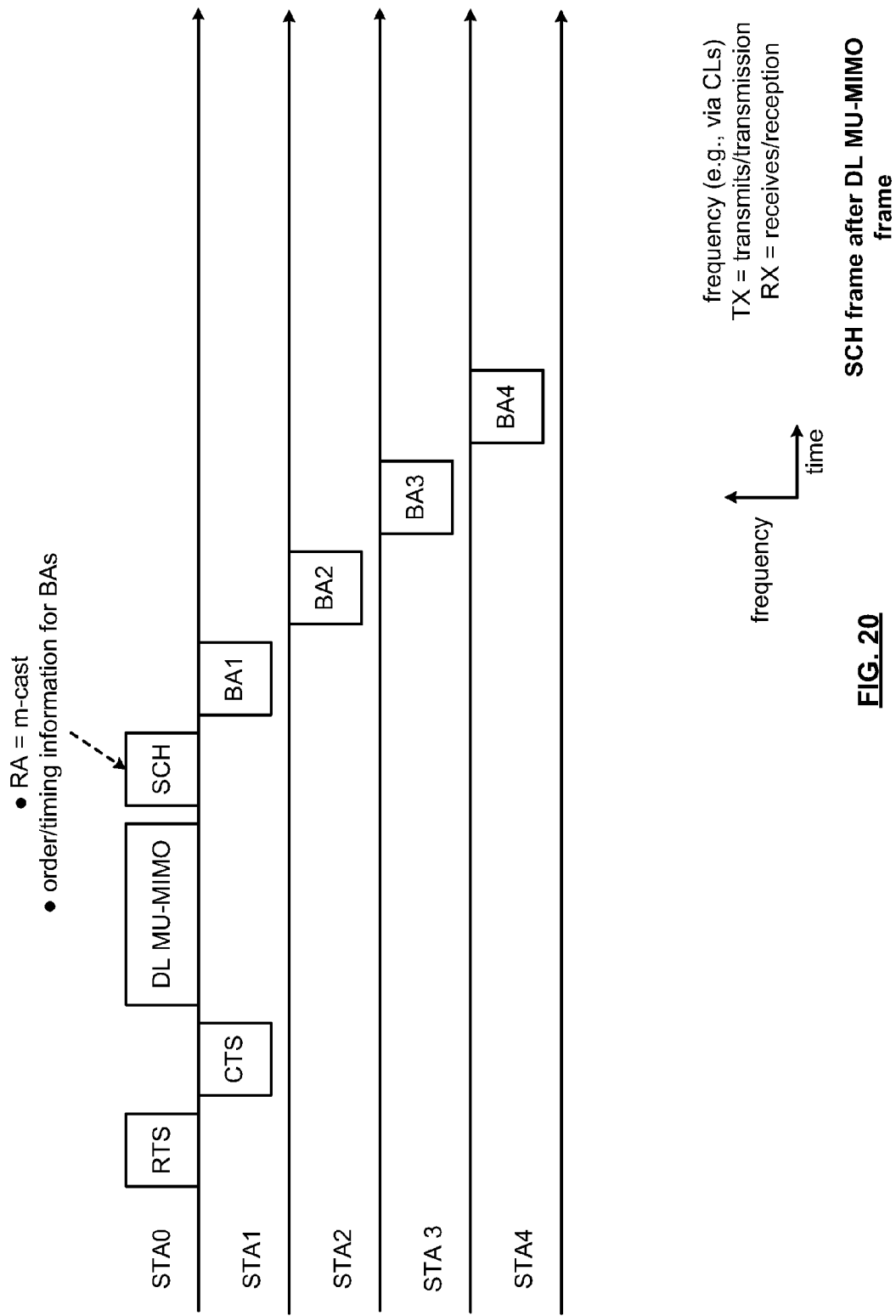
FIG. 20 is a diagram illustrating an embodiment of a timing diagram showing a schedule (SCH) frame being transmitted after a downlink multiple input multiple output (MU-MIMO) frame.

FIG. 20 is a diagram illustrating an embodiment of a timing diagram showing a schedule (SCH) frame being transmitted after a downlink multiple input multiple output (MU-MIMO) frame. In this embodiment, SCH frame sent after DL MU-MIMO transmission. The SCH frame is sent with RA=multi-cast in this sequence. The SCH frame may be sent after the downlink MU-MIMO frame that follows a request to send/clear to send (RTS/CST) frame exchange.

STA receiving SCH frame examines TA field to see if it matches MAC address of the AP with which the STA is associated. If TA=AP address for this STA, then the STA examines the SCHED field in the frame to determine if it is identified as a responder in this SCH frame, and if so, it extracts the response scheduling information from the SCHED field and uses this information to schedule a subsequent response transmission. The order and/or timing of response BA transmissions is according to information that was delivered within the SCH frame.

Figure 21:
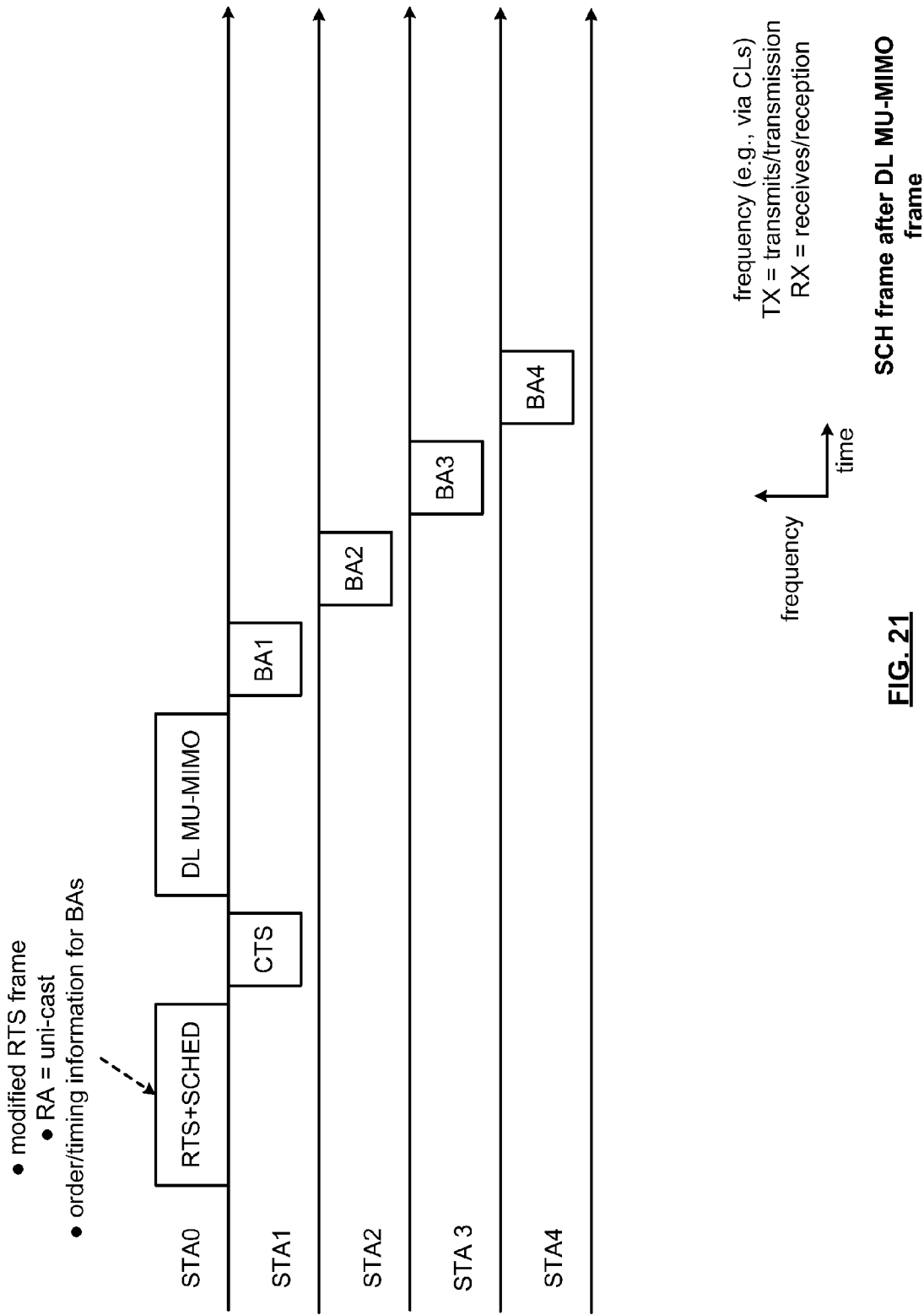
FIG. 21 is a diagram illustrating an embodiment of a timing diagram showing an exchange employing a modified RTS frame.

FIG. 21 is a diagram illustrating an embodiment of a timing diagram showing an exchange employing a modified RTS frame. This embodiment shows schedule information (SCHED field) carried within modified RTS frame. The RTS frame in this exchange has RA=uni-cast. The STA receiving RTS frame examines TA field to see if it matches MAC address of the AP with which the STA is associated. If TA=AP address for this STA, then the STA examines the SCHED field in the frame to determine if it is an intended recipient of the expected subsequent DL MU-MIMO frame and if so, extracts the response scheduling information from the SCHED field and schedules a response transmission at the corresponding time indicated in the SCHED field. The order and/or timing of response BA transmissions is according to information that was delivered within the Schedule information from the modified RTS frame.

Generally speaking, any of a number of different types of frames may be modified to include certain scheduling information therein. In fact, any signal or communication from a transmitting wireless communication device to a number of receiving wireless communication devices may include scheduling information therein to direct the manner by which responses are to be provided from those receiving wireless communication devices to the transmitting wireless communication device. In addition, as has also been described with respect other embodiments and/or diagrams herein, additional information such as order, timing, cluster assignment, etc. may also be included within such scheduling information to direct the manner by which such responses are to be provided from the receiving wireless communication devices to the transmitting wireless communication device.

Figure 22:
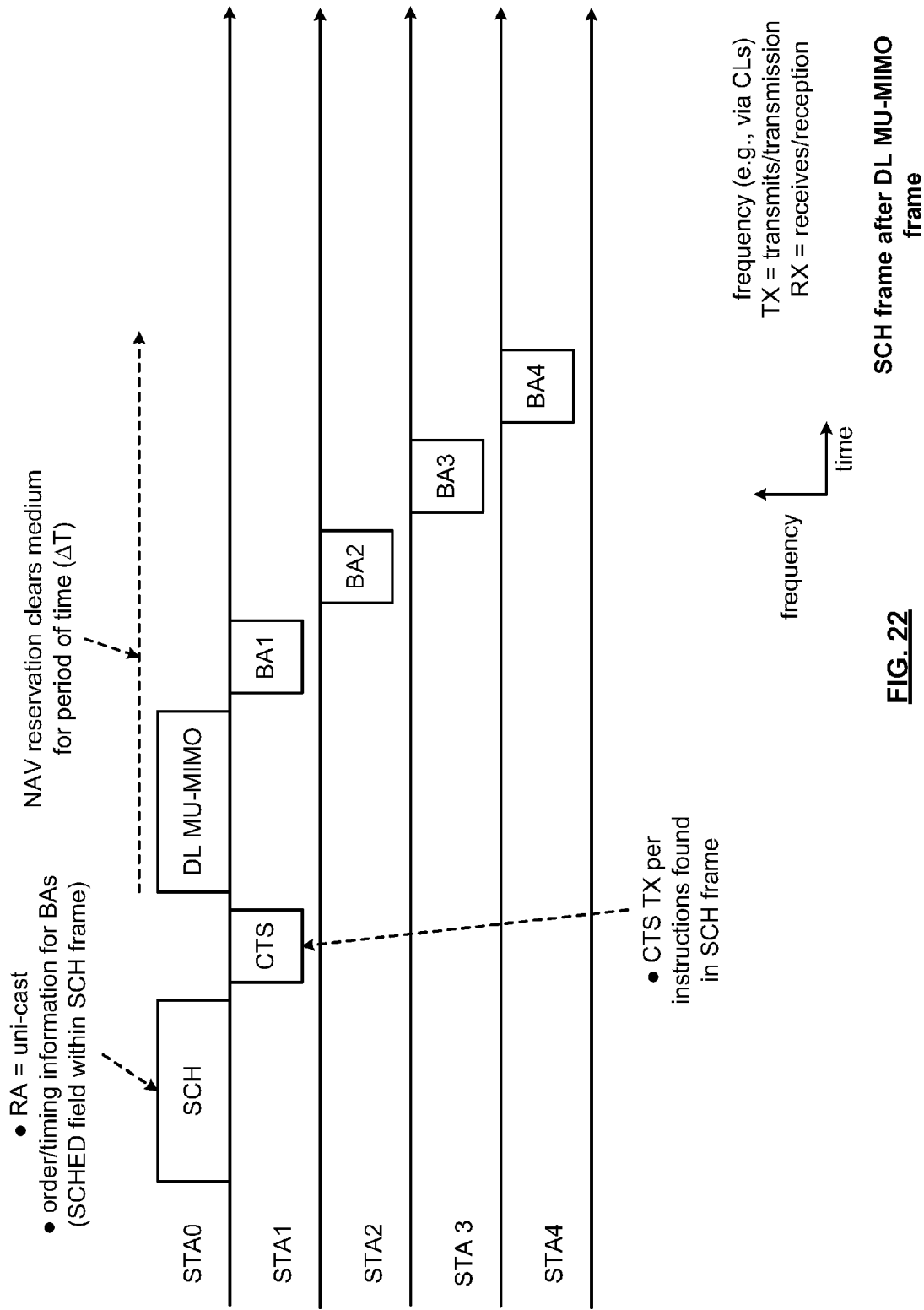
FIG. 22 is a diagram illustrating an embodiment of a timing diagram showing an exchange employing a schedule (SCH) frame at start.

FIG. 22 is a diagram illustrating an embodiment of a timing diagram showing an exchange employing a schedule (SCH) frame at start. This embodiment shows schedule information (SCHED field) carried within SCH frame. The SCH frame in this exchange has RA=uni-cast. STA receiving SCH frame examines TA field to see if it matches MAC address of the AP with which the STA is associated. If TA=AP address for this STA, then the STA examines the SCHED field in the frame to determine if it is an intended recipient of the expected subsequent DL MU-MIMO frame and if so, extracts the response scheduling information from the SCHED field and uses this information to schedule a subsequent response transmission.

CTS is transmitted according to instructions found in SCH frame. The SCH frame is addressed to uni-cast RA. The STA with MAC address that matches uni-cast RA of SCH frame responds with CTS frame. The order and/or timing of response BA transmissions is according to information that was delivered within the Schedule information from the SCH frame.

Figure 23:
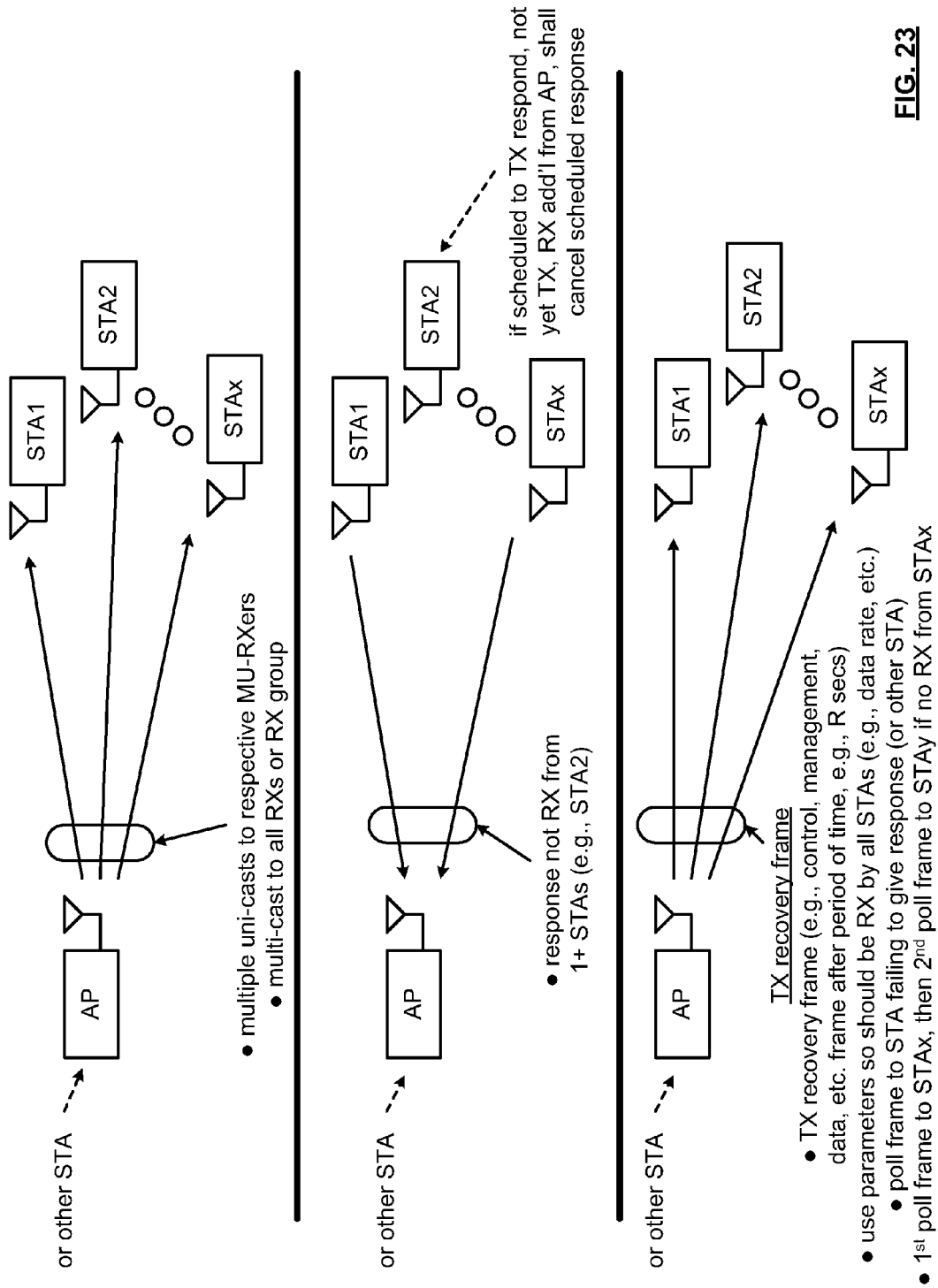
FIG. 23 is a diagram illustrating an embodiment of a wireless communication system in which recovery mechanisms may be performed between various wireless communication devices therein.

FIG. 23 is a diagram illustrating an embodiment of a wireless communication system in which recovery mechanisms may be performed between various wireless communication devices therein. Any of various recovery mechanisms may be performed when a transmission is sent from a transmitting wireless communication device (e.g., AP) to various receiving wireless communication devices (e.g., STAs). When at least one of the receiving wireless communication devices (e.g., STAs) fails to provide a response to the transmitting wireless communication device (e.g., AP), various recovery mechanisms may be performed including transmitting a recovery frame from the transmitting wireless communication device (e.g., AP) to one, a subset, or all of the receiving wireless communication devices (e.g., STAs). Various manners by which such recovery mechanisms may be performed are described herein.

In accordance with the PCF inter-frame space (PIFS) (where PCF is point coordinated function) recovery mechanism in accordance with IEEE 802.11n, after a valid response to the initial frame of a TXOP, if the Duration/ID field is set for multiple frame transmission and there is a subsequent transmission failure, the corresponding channel access function may recover transmit after the CS mechanism (see 9.2.1 in IEEE 802.11n) indicates that the medium is idle at the TxPIFS slot boundary (defined in 9.2.10 in IEEE 802.11n) before the expiration of the TXNAV timer. At the expiration of the TXNAV timer, if the channel access function has not regained access to the medium, then the EDCAF shall invoke the backoff procedure that is described in 9.9.1.5 in IEEE 802.11n. Transmission failure is defined in 9.9.1.5 in IEEE 802.11n.

Various acknowledgement methods and mechanisms may be performed in accordance with the principles herein. For example, such acknowledgements may be made in response to a multi-user transmission. The recipients of the transmission may need to acknowledge their receipt of their portion of the multi-user transmission.

For example, if the mechanism for acknowledgement is Polled, then an existent recovery mechanism may be employed. Polled mechanism is under the direction of the multi-user frame transmitter, which maintains control of the medium by polling, and therefore, recovery is according to normal transmitter recovery rules. The MU-TXer follows the transmission with a sequence of polls which solicit responses. Failed responses can be followed by more polls.

If the mechanism for acknowledgement is Slotted, then an existent recovery mechanism may be employed. Slotted acknowledgement passes control to each responder in turn according to a slot number. When a responder fails to occupy its assigned slot, the next slot appears and the next responder occupies that next slot.

If the mechanism for acknowledgement is Scheduled, then various recovery mechanism approaches and means in accordance with the principles presented herein and their equivalents may be employed. If an intended recipient fails to respond, then the communication medium (e.g., air) might appear to be IDLE in the absence of a response and an unrelated STA might attempt to take control of the medium during this IDLE time. A recovery mechanism may attempt to prevent unwanted STAs from taking control by occupying the IDLE time while simultaneously attempting to retrieve the information that initially failed to be transmitted.

A multi-user scheduled response recovery overview is initially provided below with respect to each of recovery mechanism associated with transmitting wireless communication devices and receiving wireless communication devices.

Transmitter Recovery

A MU-TXer employing scheduled response may transmit a packet to recover the channel access mechanism in the case of a failure. Such a recovery packet may be a POLL frame (e.g., the MU-TXer may fall back to polled method to retrieve the remaining response frames if an MU-RXer fails to transmit its corresponding response frame).

A multi-poll frame may be used to poll for the rest of the response frame(s) when any MU-RXer fails to transmit its corresponding response frame. A multi-poll frame may include an MU scheduling field providing response schedule information for the MU-RXer(s) that have not transmitted their response frames as of the time of the transmission of the multi-poll frame.

The MU-TXer may recover if it does not receive a multi-user response from an intended MU-RXer j after some period of time (e.g., R seconds) from the originally scheduled response transmission time. Recipients must cancel any pre-scheduled response transmissions if a POLL or MULTI-POLL frame is transmitted. This time period, R, may be PIFS.

The MU-TXer may recover if the medium is not IDLE when the response frame is expected, and a response frame is not received successfully at expected time.

Receiver Recovery

Such operation may be performed if a receiver j (e.g., MU-RXer j) does not receive a packet successfully, but that receiver j knows that it is an intended receiver of at least a portion of a multi-user packet.

The MU-RXer j may transmit, at the scheduled response time, a packet indicating it has failed to receive/decode a multi-user packet successfully. The transmission must not take longer than the time that was originally scheduled for the response transmission. Information indicating that the receiver j is an intended receiver may be obtained by examining the contents of any one or more of: Group ID if it is not overloaded, MAC address included in MAC header, Modified MPDU delimiter, Modified RTS.

Considering even more details related to transmitter recovery, transmitter recovery mechanisms may be performed after a two-way frame exchange preceding the exchange of frames between a MU-TXer and one or more MU-RXers. Frames in the two-way exchange contain DUR information which is received by other STAs. These frames have uni-cast RA and are generally transmitted at lower rates in order to maximize the probability of reception by third-party receivers. The MU-TXer can track the transmitted DUR information with a TXNAV counter.

If a MU-TXer does not receive an expected response/feedback from an intended MU-RXer and the MU-TXer is tracking the DUR information with a TXNAV counter and the TXNAV is non-zero, a variety of operations may be performed.

For example, not receiving an expected response means that the medium is determined by the MU-TXer to be IDLE for PIFS time from the start of the time scheduled for the beginning of the transmission of the expected response.

If the mechanism for acknowledgement is Polled or Slotted, then existing operations may be performed.

If the mechanism for acknowledgement is Scheduled, then the MU-TXer can transmit a recovery frame after some period of time (e.g., R seconds). Various examples of such recovery frames include any one or combination of a control, a management frame, and data frame. The recovery frame can be a poll frame transmitted to the station that failed to transmit the multi-user response. The MU-RXer that failed to respond can be polled for the response/feedback frame that corresponds to the previously transmitted multi-user transmission. The MU-RXer that failed to respond can be polled for a response/feedback frame that does not correspond to the previously transmitted multi-user transmission.

The recovery frame can be a poll to another station made for requesting a feedback/response frame. The recovery frame can be to a different station after X seconds of polling one station and failing to receive an expected response.

Such recovery mechanisms may be performed for a MU-RXer that is currently scheduled to transmit a response, that has not yet transmitted that response, and/or that receives a new transmission from the MU-TXer. Such a MU-RXer shall cancel its scheduled response transmission (e.g., note the imperative nature of such cancellation).

Such recovery mechanisms may be performed for a MU-TXer should (e.g., note the permissive/allowable nature of such cancellation) use a data transmission rate for recovery transmissions that is likely to be receivable by all of the MU-RXers corresponding to the MU transmission for which recovery is being performed. This may be performed to ensure that all MU-RXers that are awaiting their scheduled response time will hear a recovery transmission and then cancel their scheduled response transmissions.

If the expected multi-user response is an ACK/BA and a MU-TXer j determines that the medium has been IDLE for PIFS following the scheduled time for the ACK/BA transmission, then a number of various operations may be performed by a transmitter. For example, the transmitter may poll MU-RXer j for ACK/BA. Alternatively, the transmitter may poll MU-RXer j for information about previously received packets (e.g., sequence number or fragment number) within a window of size of Y or previously transmitted packets to MU-RXer j. If desired, the transmitter may poll MU-RXer<>j for ACK/BA.

In certain instances, a multi-poll frame may be used to poll MU-RXer j and the rest of MU-RXer's that has not transmitted their ACK/BA for their response frame. In other situations, a multi-poll frame may be used to poll the rest of MU-RXer's (e.g., MU-RXer≠j) that has not transmitted their ACK/BA for their response frame.

If the expected multi-user response is channel feedback and an MU-TXer j determines that the medium has been IDLE for some period of time (e.g., PIFS) following the scheduled time for the transmission of the channel feedback. The transmitter may poll MU-RXer j for channel feedback. The MU-RXr j may respond with old channel information, new channel information, no channel information and/or an indication that new sounding is needed.

The transmitter may poll MU-RXer j to inquire about the quality of the received signal (e.g., to solicit performance measurement information such as SINR or effective SNR). The MU-TXer may use the information to decide if sending another sounding sequence is required.

A multi-poll frame may be used to poll MU-RXer j and the rest of MU-RXer that has not transmitted their channel feedback or other channel related information. The MU-RXer J may be polled for quality of received signal and the rest of stations may be polled for their channel feedback.

A multi-poll frame may be used to poll the rest of MU-RXer ((i.e. MU-RXer≠j)) that has not transmitted their channel feedback.

Transmitter recovery scheme may be used when a BA or feedback frame is transmitted and the MU-TXer detects energy or a packet that does not decode to the expected response frame, or results in a frame reception with errors. For example, such an instance may arise when the MU-TXer may fail to receive the BA or response frame that is transmitted due to various reasons including low SNR, collision with other transmitted frame, etc. Such an instance may alternatively arise when the responder may transmit the BA or response frame at the scheduled time, but the CRC indicates an error. Such a failure situation may arise if the responder transmits the BA or response frame at the scheduled time, but some PHY processing in the receiver may fail to recover the packet.

The two methods below may be used to recover BA/ACK or feedback frames.

First method: the MU-TXer may transmit a recovery message after the scheduled time for any subset of the participating stations to ask for BA(s)/ACK(s), feedback frame, or other response frames from stations (e.g., if a BA/ACK or feedback frame was not received successfully. A SCH frame may be used to request/schedule a response frame for stations whose responses were not received successfully.

Second method: MU-TXer can set schedule times for each responding STA such that the time between successive responding STA transmissions is greater than the time that would be needed for just the ACK or BA transmission (e.g., the time could accommodate the BA transmission plus an additional PIFS or 2×PIFS). An extended interval would allow for recovery due to FCS failure of a transmitted BA. For example, by including an additional 1×PIFS or 2×PIFS before the next responder is scheduled to start transmitting, the MU-TXer can initiate Transmitter recovery as previously described herein (e.g., by generating and transmitting a poll frame specifying such an additional time duration).

Considering even more details related to receiver recovery, receiver recovery may be performed when a MU-RXer might fail to receive a packet successfully (e.g. FCS failure occurs, some other type of failure, etc.), but the receiver might know that it is an intended receiver of the failed reception using one of the various mechanisms provided below.

The group ID in the signal field may be an indication to a STA that it is an intended receiver for a packet. If group ID over loading is used, group ID may not be enough for a receiver to know definitively that it is an intended receiver of a packet, so additional or other mechanisms may be employed.

AMPDU MPDU Delimiter with AID for MU may be used for the receiver STA to determine if it is an intended receiver. If this method is used and the CRC within the delimiter is valid, then the station has a mechanism to establish it is the intended receiver.

MAC header may correctly indicate with high probability which station is the source even if the FCS fails. CRC may be added to the MAC header to check if MAC header is received correctly.

A modified RTS may be used for a receive station to establish whether or not it is an intended receiver for a multi-user packet.

A SCH frame used to carry scheduled information may be used to provide information about the intended receivers. It is noted that, if the SCH frame is correctly received, then this information is definitive.

Portions of the DL MU-MIMO packet may not be received successfully but the scheduled time for the receiver performing the recovery may have been correctly determined from a SCH frame reception preceding the DL MU-MIMO transmission, a SCHED field included in an MPDU within the DL MU-MIMO transmission, and/or a Modified RTS that carries the schedule information in an SCHED field.

If a frame that is not received successfully is a data packet for which the receiver would have transmitted an ACK/BA had the reception been successful, then the receiver may transmit a frame that provides the transmitter with information indicating that it has not received any data frame successfully. For example, a BA frame may carry information such as the sequence numbers and/or fragment numbers of validly received MPDU/MSDUs from the transmitter of the multi-user packet. Alternatively, a NACK frame may carry information indicating that no data was received correctly. A BA frame with no ACK bits set to "1" is one form of a NACK frame. The transmitted frame should have the same length as the originally expected ACK or BA frame. Alternatively, the transmitted frame may be shorter than the originally expected frame.

Instead, if a frame that is not received successfully is a management request or control frame for which the MU-RXer would have transmitted a response. If the MU-RXer can establish that it was the intended recipient, and it can determine which STA was the MU-TXer, then it can transmit a response recovery frame. The transmitted response recovery frame should have the same length as the originally expected response frame had the management or control frame been received successfully.

A MU-RXer might fail to receive a channel sounding frame properly but it might know that it is a receiver that is scheduled to send feedback in response to the failed reception. For example, an NDP announcement frame that preceded the sounding frame may have contained information for the MU-RXer indicating that it is a sounded station and indicating what time or order it is expected to send feedback. Alternatively, an NDP frame may contain information as to which MU-RXers are sounded and in what time or order they are expected to send feedback. A modified RTS or a SCH frame carrying scheduled information may be used to indicate which STAs have been sounded and may contain their scheduled response time.

A sounded MU-RXer which failed to receive an NDP sounding sequence successfully but has definitive knowledge indicating that it has a scheduled response time may transmit a feedback recovery packet with the same length as the expected channel feedback frame that it would have transmitted if it had received the NDP sequence successfully. The feedback recovery packet may contain feedback information that is based on the last received sounding frame and/or subsequent frame exchanges. The feedback recovery packet may include the following information in its recovery response/feedback such as via an indication that it has failed to receive the NDP sequence successfully or via an indication that resounding is needed, if channel resounding is needed.

FIG. 24A, FIG. 24B, FIG. 25A, FIG. 25B, FIG. 26A, FIG. 26B, FIG. 27A, and FIG. 27B are diagrams illustrating embodiments of methods for operating one or more wireless communication devices.

The methods of FIG. 24A, FIG. 24B, FIG. 25A, FIG. 25B, and FIG. 26A may generally be viewed as being performed within a transmitting wireless communication device (e.g., an AP or a STA). The methods of FIG. 26B, FIG. 27A, and FIG. 27B may generally be viewed as being performed within a receiving wireless communication device (e.g., such as a STA).

Referring to method 2400 of FIG. 24A, the method 2400 begins by transmitting a signal, that includes scheduling information, to wireless communication devices, as shown in a block 2410. The method 2400 continues by failing to receive expected response (e.g., ACK/BA) from at least one of the wireless communication devices (e.g., MU-RXer j) for Δt (e.g., PIFS) following scheduled time for responses from wireless communication devices, as shown in a block 2420. Based upon this failure, the method 2400 then operates by transmitting poll frame to single wireless communication device, as shown in a block 2430. In certain embodiments, the poll frame may undergo transmission to MU-RXer j for ACK/BA, as shown in a block 2430a. In other embodiments, the poll frame may undergo transmission to MU-RXer j for information related to or regarding previously received packets, as shown in a block 2430b. In even other embodiments, the operations may involve polling MU-RXer k (k≠j) for ACK/BA, as shown in a block 2430c.

Referring to method 2401 of FIG. 24B, the method 2401 begins by transmitting a signal, that includes scheduling information, to wireless communication devices, as shown in a block 2411. The method 2401 then operates by failing to receive expected response (e.g., ACK/BA) from at least one of the wireless communication devices (e.g., MU-RXer j) for Δt (e.g., PIFS) following scheduled time for responses from wireless communication devices, as shown in a block 2421.

The method 2401 continues by transmitting multi-poll frame to multiple wireless communication devices, as shown in a block 2431. In some embodiments, the multi-poll frame may be transmitted to MU-RXer j and any MU-RXer from which a respective ACK/BA has not been received, as shown in a block 2431a. In even other embodiments, the multi-poll frame may be transmitted to any MU-RXer from which a respective ACK/BA has not been received, as shown in a block 2431b.

Referring to method 2500 of FIG. 25A, the method 2500 begins by transmitting a signal, that includes scheduling information, to wireless communication devices, as shown in a block 2510. The method 2500 continues by failing to receive expected response (e.g., channel feedback) from at least one of the wireless communication devices (e.g., MU-RXer j) for Δt (e.g., PIFS) following scheduled time for responses from wireless communication devices, as shown in a block 2520.

The method 2500 then operates by transmitting poll frame to single wireless communication device, as shown in a block 2530. In some embodiments, the poll frame may undergo transmission to MU-RXer j for channel feedback, as shown in a block 2530a. In other embodiments, the poll frame may undergo transmission to MU-RXer j thereby making an inquiry related to the quality of a received signal, as shown in a block 2530b.

Referring to method 2501 of FIG. 25B, the method 2501 begins by transmitting a signal, that includes scheduling information, to wireless communication devices, as shown in a block 2511. The method 2501 then operates by failing to receive expected response (e.g., channel feedback) from at least one of the wireless communication devices (e.g., MU-RXer j) for Δt (e.g., PIFS) following scheduled time for responses from wireless communication devices, as shown in a block 2521.

The method 2501 continues by transmitting a multi-poll frame to multiple wireless communication devices, as shown in a block 2531. In some embodiments, the multi-poll frame may undergo transmission to MU-RXer j and any MU-RXer from which respective channel feedback has not been received, as shown in a block 2531a. In other embodiments, the multi-poll frame may undergo transmission to any MU-RXer from which respective channel feedback has not been received, as shown in a block 2531b. In even other embodiments, the multi-poll frame may undergo transmission to an MU-RXer j thereby making an inquiry related to the quality of received signal and any MU-RXer from which respective channel feedback has not been received for their channel feedback, as shown in a block 2531c.

Referring to method 2600 of FIG. 26A, the method 2600 begins by transmitting a signal, that includes scheduling information, to wireless communication devices, as shown in a block 2610. The method 2600 continues by detecting energy or packet (e.g., ACK/BA, feedback frame from one of the wireless communication devices, e.g., MU-RXer j) that does not decode to expected frame (e.g., collisions, low SNR, CRC fails, errors, PHY processing failure, etc.), as shown in a block 2620.

The method 2600 then operates by performing recovery scheme, as shown in a block 2630. Any of a variety of recovery schemes may be employed in accordance with the various aspects presented herein or their equivalents.

Referring to method 2601 of FIG. 26B, in accordance with determining that the receiving wireless communication device is an intended MU-RXer, the method 2601 begins by failing to receive data packet successfully (e.g., FCS failure, partial decoding error, etc.), as shown in a block 2611. The method 2601 then operates by transmitting frame (e.g., to AP), with same [or shorter] length as expected response), indicating unsuccessful reception, as shown in a block 2621.

Referring to method 2700 of FIG. 27A, in accordance with determining that the receiving wireless communication device is an intended MU-RXer, the method 2700 begins by failing to receive management frame successfully, as shown in a block 2710. The method 2700 continues by transmitting response recovery frame (e.g., to AP) with same length as expected response, as shown in a block 2720.

Referring to method 2701 of FIG. 27B, in accordance with determining that the receiving wireless communication device is an intended MU-RXer, the method 2701 begins by failing to receive sounding frame successfully, as shown in a block 2711. The method 2701 then operates by transmitting feedback recovery frame (e.g., to AP) with same length as expected channel feedback frame (e.g., same length in NDP sequence received successfully), as shown in a block 2721.

In some embodiments, feedback recovery frame may be implemented as including feedback information based on last received sounding frame and/or subsequent frame exchanges, as shown in a block 2721*a*. In other embodiments, the feedback recovery frame may be implemented as including indication of failure to receive NPD sequence successfully, as shown in a block 2721*b*. In even other embodiments, the feedback recovery frame may be implemented as including indication that re-sounding needed, as shown in a block 2721*c*.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

| | | | | 2.4 GHz, 20/22 MHz channel BW, 54 Mbps max bit rate | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
a communication interface; and
a processor, at least one of the processor or the communication interface configured to:
generate a first frame that includes first data for a plurality of other wireless communication devices, wherein a first portion of the first data is for a first other wireless communication device and a second portion of first data is for a second other wireless communication device, wherein the first frame includes a scheduled response time for the plurality of other wireless communication devices to transmit a plurality of responses simultaneously to the wireless communication device, wherein the first frame also includes information to direct the first other wireless communication device to provide a first response using a first cluster during a first time period and to direct the second other wireless communication device to provide a second response using a second cluster during a second time period;
transmit the first frame to the plurality of other wireless communication devices;
receive, in response to the first frame and simultaneously at the scheduled response time, at least two of the plurality of responses respectively from at least two wireless communication devices of the plurality of other wireless communication devices, wherein a first of the plurality of responses is received from a first of the plurality of other wireless communication devices and a second of the plurality of responses is received from a second of the plurality of other wireless communication devices, wherein the at least two of the plurality of responses include at least one of an acknowledgement (ACK), a block acknowledgement (BA), or a training feedback frame;
generate a second frame that includes second data for at least one wireless communication device of the plurality of other wireless communication devices from which no response has been received in response to the first frame;

transmit the second frame to the at least one wireless communication device of the plurality of other wireless communication devices; and receive, in response to the second frame, another response from the at least one wireless communication device of the plurality of other wireless communication devices.

2. The wireless communication device of claim 1, wherein the second frame is a schedule frame that includes at least one response time for the at least one wireless communication device of the plurality of other wireless communication devices to transmit at least one response to the wireless communication device in response to the second frame.

3. The wireless communication device of claim 1, wherein the at least one of processor or the communication interface is further configured to:

receive a multi-user response frame from the at least two wireless communication devices of the plurality of other wireless communication devices at the scheduled response time based on orthogonal frequency division multiple access (OFDMA) signaling;

determine when no response has been received from the at least one wireless communication device of the plurality of other wireless communication devices after a period of time; and generate the second frame after the period of time based on determination of no response being received from the at least one wireless communication device of the plurality of other wireless communication devices after the period of time and in response to the first frame.

4. The wireless communication device of claim 1, wherein the at least one of processor or the communication interface is further configured to:

receive at least one response frame from at least one other wireless communication devices of the plurality of other wireless communication devices within a period of time after transmission of the first frame and in response to the first frame, wherein the at least one response frame includes at least one of an acknowledgement (ACK), a block acknowledgement (BA), or a training feedback frame.

5. The wireless communication device of claim 1 further comprising:

a cellular telephone, a two-way radio, a personal digital assistant (PDA), a personal computer (PC), or a laptop computer.

6. The wireless communication device of claim 1, wherein the at least one of processor or the communication interface is further configured to:

generate the first frame also to include information to direct the first other wireless communication device to provide a first response of a first type and to direct the second other wireless communication device to provide a second response of a second type, wherein at least one of the first or second type is an acknowledgement (ACK), a block acknowledgement (BA), or a training feedback frame.

7. The wireless communication device of claim 1, wherein the at least one of processor or the communication interface is further configured to:

receive at least one response frame from at least one other wireless communication devices of the plurality of other wireless communication devices within a period of time after transmission of the first frame and in response to the first frame;

determine when no response has been received from the at least one wireless communication device of the plurality of other wireless communication devices after the period of time;

generate the second frame after the period of time, wherein the second frame is a recovery frame that is generated based on determination of no response being received from the at least one wireless communication device of the plurality of other wireless communication devices after the period of time and in response to the first frame; and transmit the second frame, via the communication interface, after another period of time that follows the period of time using a data transmission rate that is supported by all of the plurality of wireless communication devices.

8. The wireless communication device of claim 1 further comprising:

an access point (AP), wherein the plurality of other wireless communication devices includes at least one wireless station (STA).

9. A wireless communication device comprising:

a communication interface; and a processor, at least one of the processor or the communication interface configured to:

generate a first frame that includes first data for a plurality of other wireless communication devices, wherein a first portion of the first data is for a first other wireless communication device and a second portion of first data is for a second other wireless communication device, wherein the first frame includes a first scheduled response time for the plurality of other wireless communication devices to transmit a plurality of responses simultaneously to the wireless communication device, wherein the first frame also includes information to direct the first other wireless communication device to provide a first response using a first cluster during a first time period and to direct the second other wireless communication device to provide a second response using a second cluster during a second time period;

transmit the first frame to the plurality of other wireless communication devices;

receive, in response to the first frame and simultaneously at the first scheduled response time, a multi-user response frame that is based on orthogonal frequency division multiple access (OFDMA) signaling, wherein the multi-user response frame includes at least two of the plurality of responses respectively from at least two wireless communication devices of the plurality of other wireless communication devices, wherein a first of the plurality of responses is received from a first of the plurality of other wireless communication devices and a second of the plurality of responses is received from a second of the plurality of other wireless communication devices;

receive at least one response frame from at least one other wireless communication devices of the plurality of other wireless communication devices within a period of time after transmission of the first frame and in response to the first frame, wherein the at least one response frame includes at least one of an acknowledgement (ACK), a block acknowledgement (BA), or a training feedback frame;

generate a second frame that includes second data for at least one wireless communication device of the plurality of other wireless communication devices from which no response has been received in response to the first frame;

transmit the second frame to the at least one wireless communication device of the plurality of other wireless communication devices, wherein the second frame is a schedule frame that includes a second scheduled response time for the at least one wireless communication device of the plurality of other wireless communication devices to transmit at least one response to the wireless communication device in response to the second frame; and receive, in response to the second frame and at the second scheduled response time, the at least one response from the at least one wireless communication device of the plurality of other wireless communication devices.

10. The wireless communication device of claim 9, wherein the at least one of processor or the communication interface is further configured to:

determine when no response has been received from the at least one wireless communication device of the plurality of other wireless communication devices after the period of time; and generate the second frame after the period of time based on determination of no response being received from the at least one wireless communication device of the plurality of other wireless communication devices after the period of time and in response to the first frame.

11. The wireless communication device of claim 9 further comprising:

a cellular telephone, a two-way radio, a personal digital assistant (PDA), a personal computer (PC), or a laptop computer.

12. The wireless communication device of claim 9, wherein the at least one of processor or the communication interface is further configured to:

determine when no response has been received from the at least one wireless communication device of the plurality of other wireless communication devices after the period of time;

generate the second frame after the period of time, wherein the second frame is a recovery frame that is generated based on determination of no response being received from the at least one wireless communication device of the plurality of other wireless communication devices after the period of time and in response to the first frame; and transmit the second frame after another period of time that follows the period of time using a data transmission rate that is supported by all of the plurality of wireless communication devices.

13. The wireless communication device of claim 9 further comprising:

an access point (AP), wherein the plurality of other wireless communication devices includes at least one wireless station (STA).

14. A method for execution by a wireless communication device, the method comprising:

generating a first frame that includes first data for a plurality of other wireless communication devices, wherein a first portion of the first data is for a first other wireless communication device and a second portion of first data is for a second other wireless communication device, wherein the first frame includes a scheduled response time for the plurality of other wireless communication devices to transmit a plurality of responses simultaneously to the wireless communication device, wherein the first frame also includes information to direct the first other wireless communication device to provide a first response using a first cluster during a first time period and to direct the second other wireless communication device to provide a second response using a second cluster during a second time period;

transmitting, via a communication interface of the wireless communication device, the first frame to the plurality of other wireless communication devices;

receiving, via a communication interface in response to the first frame and simultaneously at the scheduled response time, at least two of the plurality of responses respectively from at least two wireless communication devices of the plurality of other wireless communication devices, wherein a first of the plurality of responses is received from a first of the plurality of other wireless communication devices and a second of the plurality of responses is received from a second of the plurality of other wireless communication devices, wherein the at least two of the plurality of responses include at least one of an acknowledgement (ACK), a block acknowledgement (BA), or a training feedback frame;

generating a second frame that includes second data for at least one wireless communication device of the plurality of other wireless communication devices from which no response has been received, via the communication interface, in response to the first frame;

transmitting, via the communication interface, the second frame to the at least one wireless communication device of the plurality of other wireless communication devices; and receiving, in response to the second frame, another response from the at least one wireless communication device of the plurality of other wireless communication devices.

15. The method of claim 14, wherein the second frame is a schedule frame that includes at least one response time for the at least one wireless communication device of the plurality of other wireless communication devices to transmit at least one response to the wireless communication device in response to the second frame.

16. The method of claim 14 further comprising:

receiving a multi-user response frame from the at least two wireless communication devices of the plurality of other wireless communication devices at the scheduled response time based on orthogonal frequency division multiple access (OFDMA) signaling;

determining when no response has been received from the at least one wireless communication device of the plurality of other wireless communication devices after a period of time; and generating the second frame after the period of time based on determination of no response being received from the at least one wireless communication device of the plurality of other wireless communication devices after the period of time and in response to the first frame.

17. The method of claim 14 further comprising:
receiving at least one response frame from at least one other wireless communication devices of the plurality of other wireless communication devices within a period of time after transmission of the first frame and in response to the first frame, wherein the at least one response frame includes at least one of an acknowledgement (ACK), a block acknowledgement (BA), or a training feedback frame.

18. The method of claim 14 further comprising:
generating the first frame also to include information to direct the first other wireless communication device to provide a first response of a first type and to direct the second other wireless communication device to provide a second response of a second type, wherein at least one of the first or second type is an acknowledgement (ACK), a block acknowledgement (BA), or a training feedback frame.

19. The method of claim 14 further comprising:
receiving at least one response frame from at least one other wireless communication devices of the plurality of other wireless communication devices within a period of time after transmission of the first frame and in response to the first frame;

determining when no response has been received from the at least one wireless communication device of the plurality of other wireless communication devices after the period of time;

generating the second frame after the period of time, wherein the second frame is a recovery frame that is generated based on determination of no response being received from the at least one wireless communication device of the plurality of other wireless communication devices after the period of time and in response to the first frame; and transmitting the second frame, via the communication interface, after another period of time that follows the period of time using a data transmission rate that is supported by all of the plurality of wireless communication devices.

20. The method of claim 14, wherein the wireless communication device is an access point (AP), wherein the plurality of other wireless communication devices includes at least one wireless station (STA).

* * * * *